(12) United States Patent
Ono

(10) Patent No.: US 6,466,950 B1
(45) Date of Patent: Oct. 15, 2002

(54) UPDATE LOG MANAGEMENT DEVICE AND AN UPDATE LOG MANAGEMENT METHOD DECREASING THE DATA AMOUNT OF TRANSMITTING AND THE UPDATE LOG AMOUNT OF HOLDING BASED ON THE RESULT OF COMPARING THE AMOUNT OF THE UPDATE LOG WITH THE AMOUNT OF THE UPDATED DATA PLUS THE LOG APPLIED INFORMATION

(75) Inventor: Ryoji Ono, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/243,813

(22) Filed: Feb. 3, 1999

(30) Foreign Application Priority Data

Oct. 20, 1998 (JP) ............................................. 10-297797

(51) Int. Cl.[7] .......................... G06F 12/00; G06F 17/30
(52) U.S. Cl. ........................ 707/201; 707/10; 707/202; 707/203; 707/204
(58) Field of Search ................................ 707/201–204, 707/10; 709/217–219

(56) References Cited

U.S. PATENT DOCUMENTS

| | | | | |
|---|---|---|---|---|
| 5,278,982 A | * | 1/1994 | Daniels et al. ............... | 707/202 |
| 5,455,944 A | * | 10/1995 | Haderle et al. .............. | 707/202 |
| 5,613,113 A | * | 3/1997 | Goldring .................... | 707/202 |
| 5,765,171 A | * | 6/1998 | Gehani et al. ............... | 707/203 |
| 5,781,910 A | * | 7/1998 | Gostanian et al. ........... | 707/201 |
| 5,890,154 A | * | 3/1999 | Hsiao et al. .................... | 707/8 |
| 5,926,816 A | * | 7/1999 | Bauer et al. ..................... | 707/8 |
| 5,999,935 A | * | 12/1999 | Clark et al. .................. | 707/101 |
| 6,092,086 A | * | 7/2000 | Martin et al. ................ | 707/202 |
| 6,098,078 A | * | 8/2000 | Gehani et al. ............... | 707/203 |
| 6,101,497 A | * | 8/2000 | Ofek ............................ | 707/10 |
| 6,170,063 B1 | * | 1/2001 | Golding ....................... | 713/502 |
| 6,192,365 B1 | * | 2/2001 | Draper et al. ................ | 707/101 |

FOREIGN PATENT DOCUMENTS

| | | | |
|---|---|---|---|
| JP | 10154092 | 6/1998 | |
| WO | WO-95/34032 A1 | * 12/1995 | ............. G06F/5/00 |

OTHER PUBLICATIONS

King et al. "Management of a Remote Backup Copy for Disaster Recovery", ACM Transactions on Database Systems, vol. 16, No. 2, Jun. 1991, pp. 338–368.*

Singhal, M. "A Fully–Distrubuted Approach to Concurrency Control in Replicated Database Systems", Proceedings of the 12th International Conference on Conputer Software and Applications, Oct. 5–7, 1998, pp. 353–360.*

"Optimistic Data Consistency Model and its Application for Database Management," Masahiro Kuroda et al. Section 6 'Access Domain' only.

"Data Transfer Architcture of Optimistic Data Consistency Model," Masahiro Kuroda et al. Abstract Only.

* cited by examiner

*Primary Examiner*—Jean R. Homere
*Assistant Examiner*—Luke S. Wassum

(57) ABSTRACT

In the data sharing system which maintains the identical data among the all terminals, the update log of the updated data is deleted as early as possible. This way, the amount of data of the update logs to be recorded in a terminal can be made small. Instead of transmitting the update logs (for example, total 100 bytes) which are extracted by the extracting unit to the other terminals, an amount of data involved in transmitting is less by transmitting the data copy of the inspection data and the log applied information (for example, total 90 bytes). Because of this, the comparing unit decides that the update logs are the update logs that need not be transmitted to the other terminals. The transmitting unit transmits the data copy of the inspection data and the log applied information to the other terminals. The deleting unit decides that the update logs need not be transmitted to all the terminals, therefore, the update logs are deleted from the terminal.

10 Claims, 24 Drawing Sheets

UPDATE LOG MANAGEMENT DEVICE AND AN UPDATE LOG MANAGEMENT METHOD DECREASING THE DATA AMOUNT OF TRANSMITTING AND THE UPDATE LOG AMOUNT OF HOLDING BASED ON THE RESULT OF COMPARING THE AMOUNT OF THE UPDATE LOG WITH THE AMOUNT OF THE UPDATED DATA PLUS THE LOG APPLIED INFORMATION

BACKGROUND OF THE INVENTION

1. Field of the Invention

The present invention relates to a technique to transmit and receive data between a plurality of devices connected in a network environment, and maintain identical data at each one of the plurality of devices.

2. Background Arts

The network environment where the transmission and reception of data between information processing devices (simply referred to as devices) takes place includes not only communication in highly reliable and high speed network environments using a LAN (local area network) and a special channel, but also includes communication using channels that are less reliable and relatively low in speed such as a mobile communication and a public network. Supposing that a device transmits data which is received by another device using the channels mentioned above, in the system where the data can only be stored to a server having sufficiently large memory and high processing performance and data stored in the server is manipulated from other devices, the transmission and reception of data must take place frequently in large amounts, resulting in problems of increased processing time and increased communication cost.

In order to resolve such problems, a method of storing a copy of the server data to each terminal is adopted, and the server data is manipulated from each terminal. However, even by this method, the result of data manipulation that takes place at each terminal must further be transmitted to all other terminals present in the system. As a general method to reduce the communication cost upon transmitting the result of data manipulation to the other terminals, there is a method not to transmit and receive the data itself but to transmit and receive the update log instead. Each terminal stores contents of all other updates of the data which took place at the other terminals as the update logs. When the updated data of each terminal is being synchronized with the data of the other terminals and the server data, then the update logs are transmitted and received instead of the updated data itself. At this time, a conflict between these data may need to be solved. Various well-known techniques are used to treat such conflicts. For instance, when the data is a file in a file system, one can adopt a method mentioned in the following document: P. Reiher, et. al., "Resolving File Conflicts in the Ficus File System", USENIX Conference Proceedings, pp. 183–195. USENIX, June 1994.

For a first terminal to transmit an update log of the updated data to a second terminal, a method for selecting the update log that is not present in the second terminal is required, among all the update logs that are present in the first terminal. To achieve this selection method, the second terminal that needs to obtain an update log from the first terminal must transfer an information informing a server or the first terminal having all the update logs which one of the update logs are already being stored in the second terminal. This information is called a log record information. Based on the log record information of the second terminal, the update log which is required for transmitting to the second terminal (or to the server) is extracted from the first terminal. The first terminal then transmits the extracted update log to the second terminal.

Accordingly, a content of the update log that is transmitted and received depends on the log record information of the second terminal. It is not generally possible to predict from another terminal which terminal copies data and when such a terminal copies the data of the server. When the terminal does not have the required update log, then the data itself can possibly be transmitted instead of the update log, although this invites a problem of increased amount of data transferring between the terminals. It is therefore desirable that each terminal stores as much of the update logs as possible.

However, a capacity of the non-volatile storage memory at each terminal is limited, and storing all of the update logs there is virtually impossible. Also, storing a large amount of update logs may suppress the capacity of the memory at each terminal which effects other processing that need be performed by the terminal.

If an update log is distributed to all the terminals storing the log record information, then there will be no more terminals that will be requiring this update log. It is then possible to delete this update log. By deleting the update log that is no longer required, the amount of memory which has been used for storing the update logs is decreased.

For example, a version vector that records data updating counts per each terminal is used as the log record information in the following document: Popek, et. al., "Replication in Ficus Distributed File Systems", Proceedings of the IEEE Workshop on Management of Replicated Data, November, 1990. In another document by D. Ratner, et. al., "Dynamic Version Vector Maintenance", UCLA Technical Report CSD-970022, June 1997, an information indicating the data updating counts per each terminal is also included in the version vector. In this document, a verification means called an one-phase bit vector is used to verify that this information included in the version vector is distributed to all the terminals. The one-phase bit vector uses a method to decrement a value of the data updating counts per each terminal by an amount of version vectors distributed to all the terminals. By using this concept, it is possible to delete the update logs, in order from the oldest update log, by a number of times equating to the decremented value of the data updating counts. This means that the update logs which are distributed to all of the terminals can be deleted from all the terminals.

When there are many terminals in a system, verifying whether or not all the terminals store a specific update log is time consuming and is costly because the verification means must also be accompanied by a transmission of the updated content. When engaging a long time in the verification process, the number of update logs that need to be verified will be increased during this verification time. The number of update logs that need be stored in the terminal will also be increased in a case involving many terminals compared to a case involving fewer terminals in the system. For the purpose of avoiding this from happening, the first terminal may inquire all the terminals. However, it is not preferable for the first terminal to directly inquire all the terminals, because this leads to an increase in the communication cost.

Also, suppose that if all the terminals in the system are being used (i.e. all the terminals are turned-on), then even though an enormous amount of time may be required for copying a specific update log to all of the terminals, the update log will eventually be distributed to all of the terminals, and after that the update log can be deleted. However, the update log cannot be deleted if there is a terminal in the system which is not being used for a long period of time, because this terminal which is not being used (i.e. a terminal is turned-off) has not at all received any update logs during the period of non-operation, and therefore this will result in an increased amount of update logs that cannot be deleted from the terminals for a long period of time. Also, when there is a terminal which participated in a system at one time but ceased to participate from a certain point of time, then the update logs could never be deleted using the conventional method.

The present invention attempts to solve the problems described above, aiming to facilitate a deleting of the update logs as early as possible. Also, the present invention aims to reduce an amount of update logs recorded in the memory of a terminal.

SUMMARY OF THE INVENTION

According to one aspect of the present invention, an update log management device used in a data sharing system for maintaining and storing a data replicated among a plurality of the devices connected in a network, comprises: a storage for recording a plurality of update logs, wherein each one of the plurality of update logs shows an update of the data; an extracting unit for extracting at least one of update logs from the plurality of update logs stored in the storage to transmit to another device to maintain the identical data among the plurality of devices; a comparing unit for calculating data amount X which is an addition of data amount of the at least one of update logs for transmitting to the another device extracted by the extracting unit, and for calculating data amount Y which is an addition of data amount of the data itself plus data amount of an information indicating that the at least one of update logs is already applied to the data itself, and for comparing the data amount X and the data amount Y; and a transmitting unit for transmitting the data itself and the information indicating that the at least one of update logs is already applied to the data to the another device if the data amount X of at the least one of update logs exceeds the data amount Y (X>Y), and for transmitting the at least one of update logs to the another device if the data amount X of the at least one of update logs does not exceed the data amount Y (X$\leq$Y).

According to another aspect of the present invention, the update log management device further comprises a deleting unit for deleting the at least one of update logs from the storage if X>Y is true for all of the devices.

According to another aspect of the present invention, the update log management device includes the storage which records a log record information which is an information indicating which update logs are stored by each one of the plurality of devices. The extracting unit decides the at least one of update logs to transmit to the another device based on the log record information.

According to another aspect of the present invention, the update log management device further comprises an excluding unit for selectively deleting the log record information of an unused device from the storage.

According to another aspect of the present invention, the update log management device includes the excluding unit which sets a time limit beforehand and deletes the log record information from the storage that is not updated during the time limit.

According to another aspect of the present invention, the update log management device includes the update log management device which sets an identifier which specifies a plurality of devices for sharing the data as one domain, and hold the log record information of the plurality of devices identified by the identifier and does not hold the log record information of the other devices.

According to another aspect of the present invention, the update log management device includes the excluding unit which receives a signal from the unused device for requesting deletion of the log record information of the unused device, and deletes the log record information of the unused device.

According to another aspect of the present invention, the update log management device includes the excluding unit which deletes the log record information of a second device stored at a first device when X>Y is true for all the data stored in the first device.

According to another aspect of the present invention, an update log management method used in a data sharing system for maintaining and storing an identical data between a plurality of the devices connected in a network, comprises the following steps: recording a plurality of update logs, wherein each one of the plurality of update logs shows an update of the data; extracting at least one of update logs from the plurality of update logs stored in the storage to transmit to another device to maintain the identical data among the plurality of devices; calculating data amount X which is an addition of data amount of the at least one of update logs for transmitting to the another device extracted by the extracting unit, and for calculating data amount Y which is an addition of data amount of the data itself plus data amount of an information indicating that the at least one of update logs is already applied to the data itself, and for comparing the data amount X and the data amount Y; and transmitting the data itself and the information indicating that the at least one of update logs is already applied to the data to the another device if the data amount X of the at least one of update logs exceeds the data amount Y (X>Y), and for transmitting the at least one of update logs to the another device if the data amount X of the at least one of update logs does not exceed the data amount Y (X$\leq$Y).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein:

FIG. 14 illustrates a belonging information indicating a domain which the terminal belongs to;

DETAILED DESCRIPTION OF THE PREFERRED EMBODIMENTS

Figure 1:
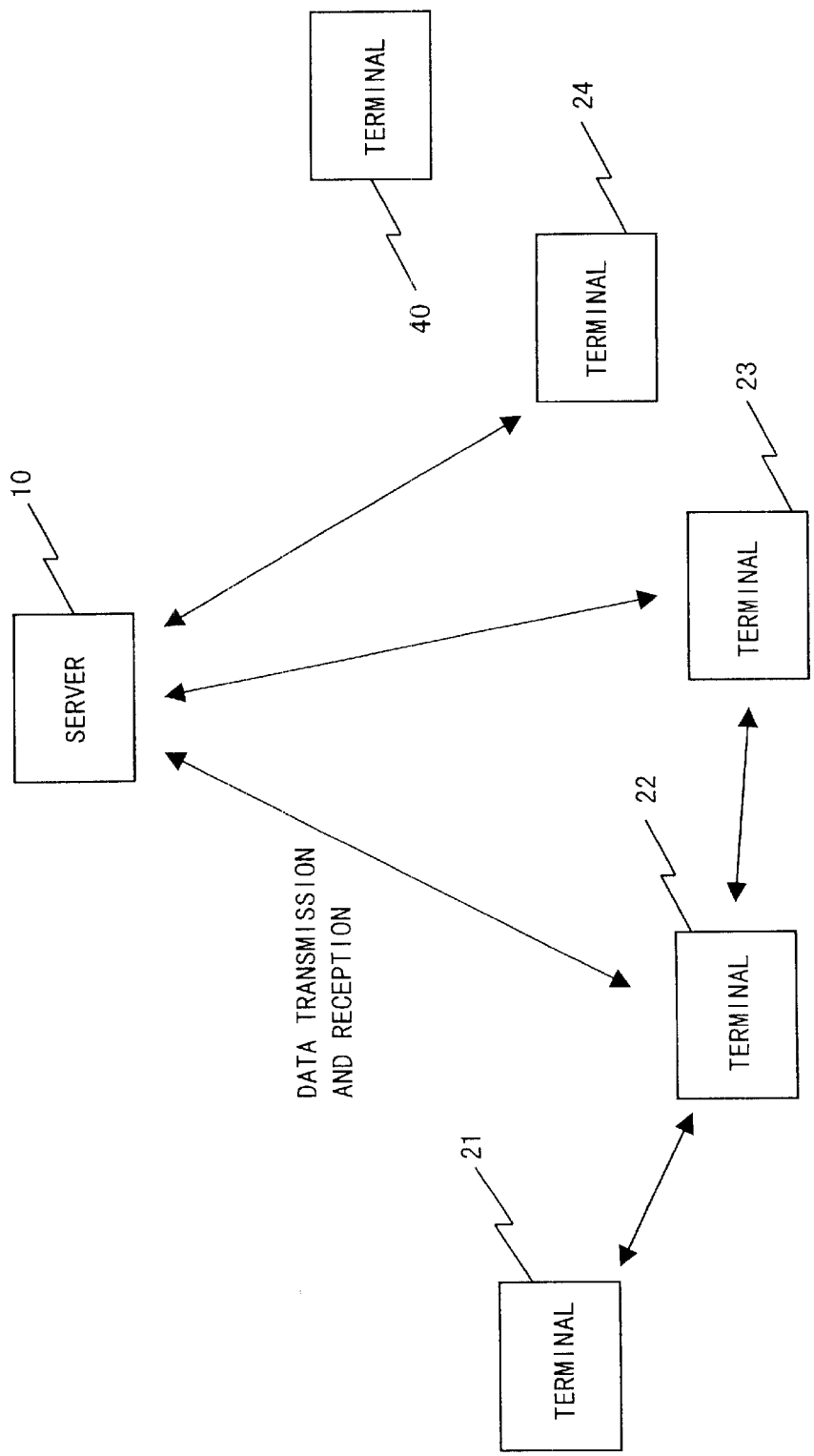
FIG. 1 illustrates a system image of inspection status reporting system.

Reference will now be made in detail to the present preferred embodiments of the invention, examples of which are illustrated in the accompanying drawings, wherein like reference numerals indicate like elements throughout the several views.

As embodiments of the present invention, an inspection status reporting system including a number of inspectors, which is used in inspecting buildings are described.

FIG. 1 illustrates an image of the inspection status reporting system.

A server 10 is located in an office where the inspectors belong to. Also, each inspector carries a terminal for reporting an inspection. The terminal is used for the inspection activities. The inspectors are not necessarily fixed in number. They may vary due to the reshuffling of personnel. Since the number of inspectors are not fixed, the system may comprise terminals 21 to 24 which are being used and a terminal 40 which is unused. The terminals 21 to 24 perform data transmission and reception with the server and the other terminals, however, the unused terminal 40 will not perform data transmission and reception with any of the devices.

Figure 2:
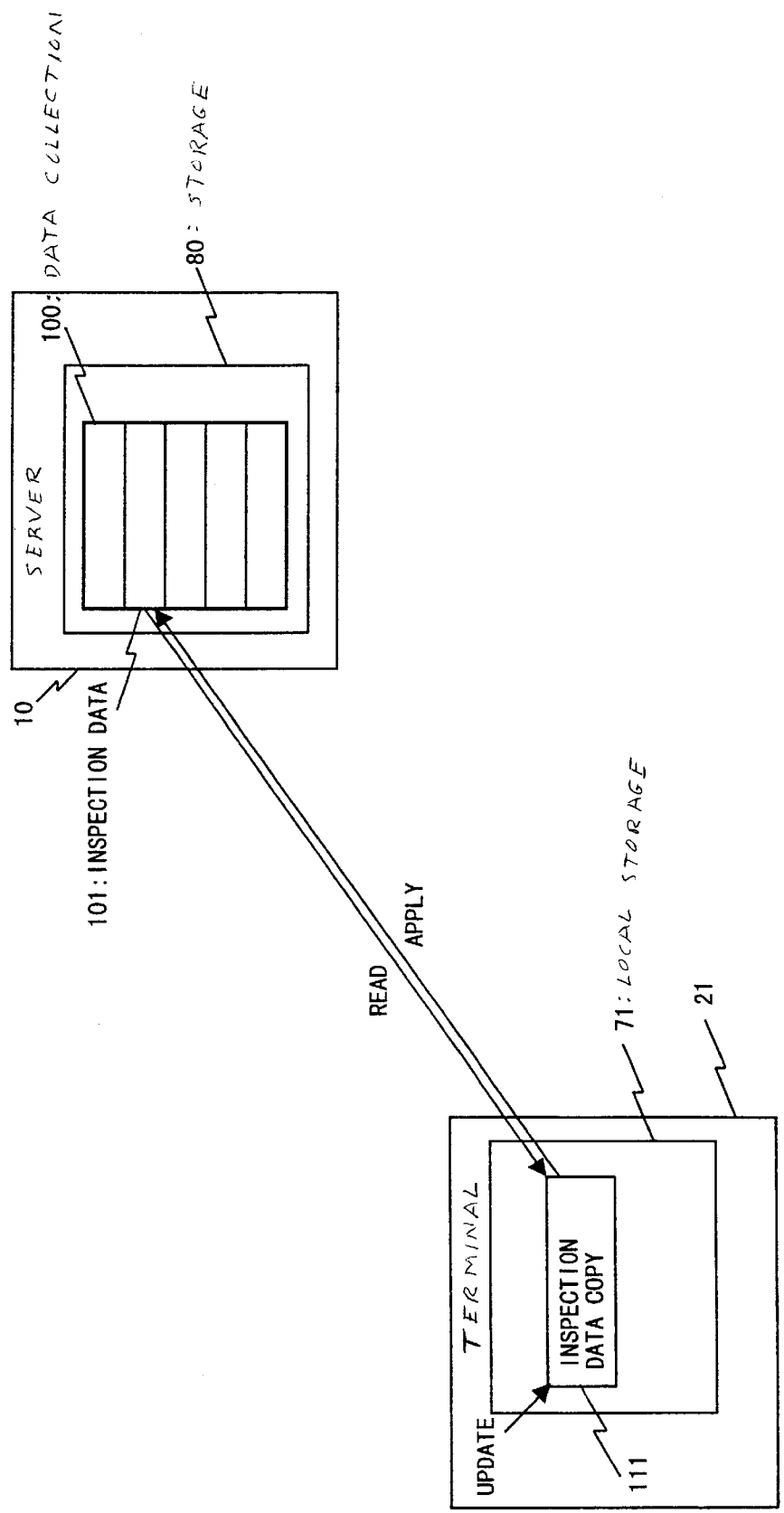
FIG. 2 outlines the data transmission and reception between a server and a terminal.

FIG. 2 outlines the data transmission and reception between the server 10 and the terminal 21.

The server 10 stores a data collection 100 in its storage 80. The following information is stored in each inspection data 101: occurrences of malfunction; contents of malfunction; inspection status; date of last inspection; person in charge of the last inspection; status of the last inspection time; and others. Before carrying out an inspection, an inspector who carries a terminal 21 reads an inspection data 101 of the server into the terminal 21. Then a data copy 111 of the inspection data 101 is provided in a local storage 71 of the terminal 21. During the inspection, the inspector updates the data copy 111 of the inspection data 101 in the terminal 21. A result of the update is stored again in the local storage 71. After the inspection, the inspection data 101 of the server 10 is updated by the terminal 21 based on the data copy 111 of the inspection data 101. That is, the data of the server 10 reflects the update in the terminal 21 carried by the inspector, and the data of the server 10 is updated at any one time.

The terminal 21 has the local storage 71. The local storage 71 of the terminal 21 stores a copy of the required data from the data collection 100 of the server, such as an inspection data which the inspector will get. A reason for storing the copy of the data is because the data unit 100 of the server 10 may include data which is not frequently updated. Another reason for storing the copy is because the communication method adopted in the present system is either the mobile communication or the public network. Since the data which is not frequently updated is included in the transmission and these communication methods have a high time charge, it is not efficient to transmit the data from the server every time the data is required, nor is it efficient to send an updated data from the terminal 21 to the server 10 every time the data of terminal 21 is updated.

In addition, an access to the server 10 may not be available at any one time. Or, there may be a case of handing over one's current inspection duty directly to another inspector. In this case, the data must be handed over to a terminal of the another inspector, directly from the one's terminal.

Figure 3:
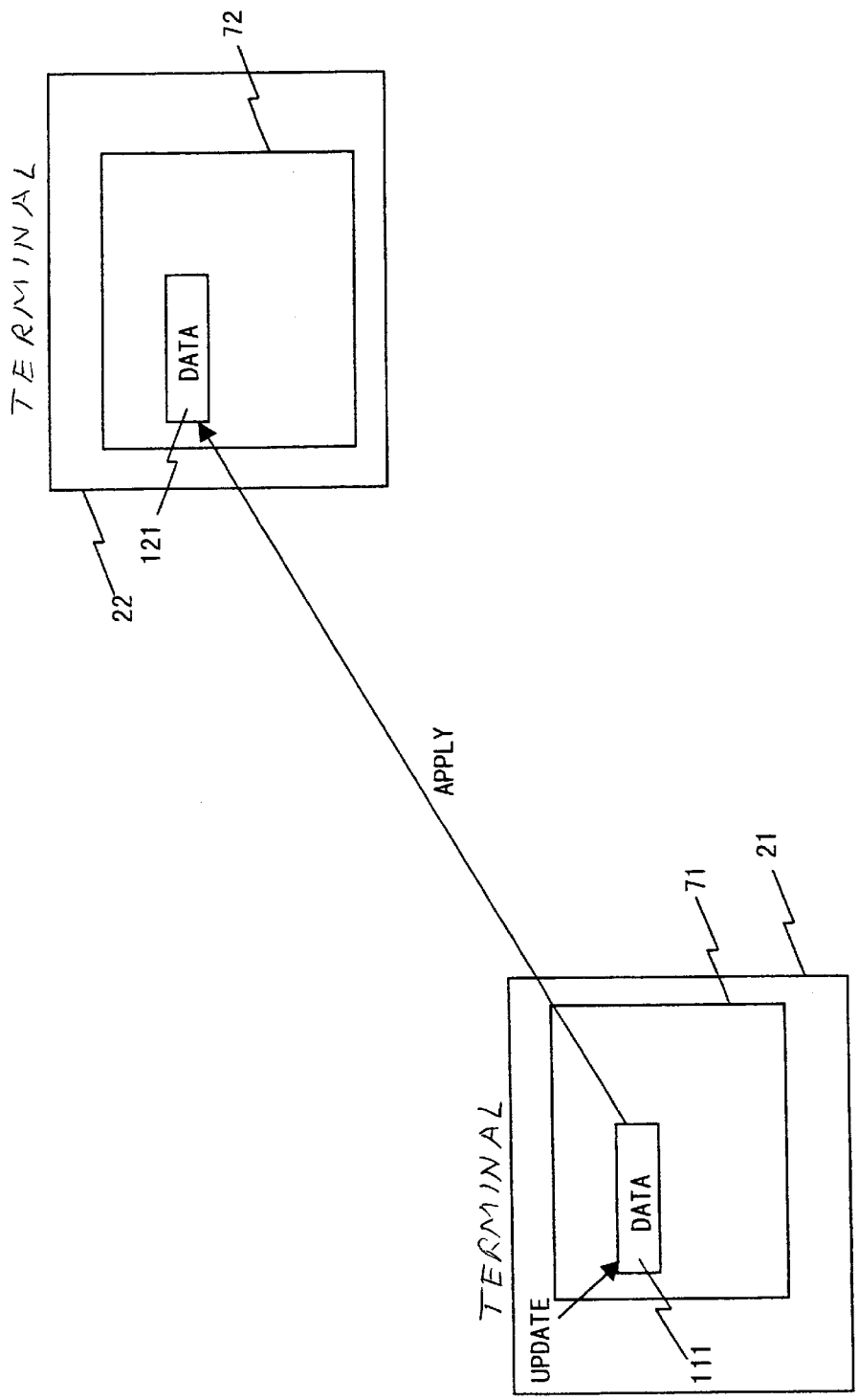
FIG. 3 outlines the data transmission and reception between terminals.

FIG. 3 outlines the data transmission and reception between the terminals.

If the data copy 111 of inspection data in the terminal 21 and a data copy 121 of inspection data in the terminal 22 are copied from the same inspection data 101 of the server, and an update is made on the data copy 111 of the terminal 21, such update must be reflected on the data copy 121 in a local storage 72 of the terminal 22. Accordingly, there may be circumstances where data may not be managed efficiently by the server since what data is present at each terminal is not known by the server.

In the interest of reducing the communication cost, the data transmission and reception between the terminals should preferably be performed by transmitting and receiving an update log 211 as much as where possible, and not the inspection data 101 or its data copy 111 itself.

Figure 4:
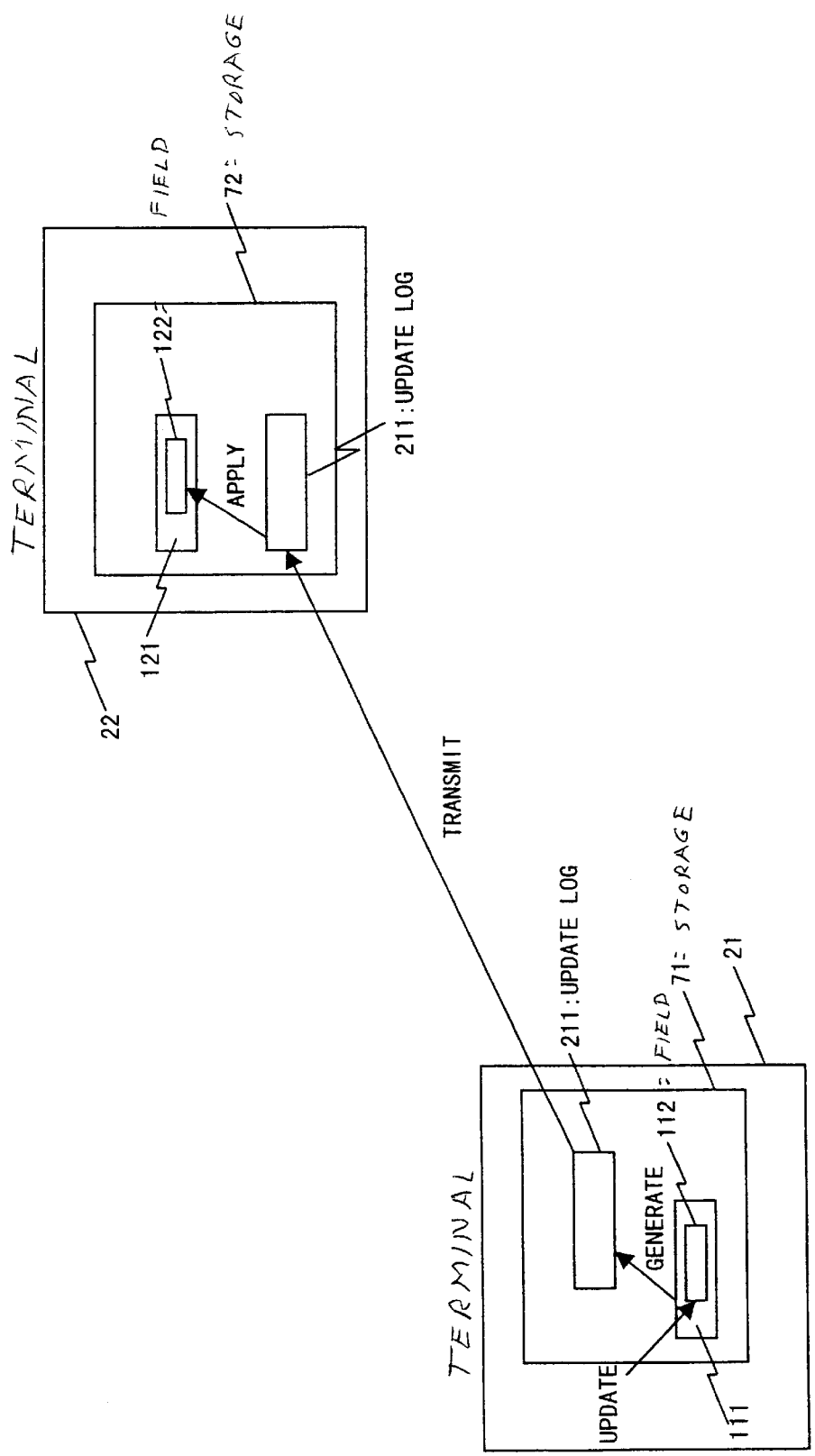
FIG. 4 outlines the transmission and reception of update log between the terminals.

FIG. 4 outlines the transmission and reception of the update log between the terminals.

The transmission and reception of the update log between the server and the terminal will be the same as the case which will be described in FIG. 4. When an inspector detects a malfunction at an inspection site, the inspector who has detected the malfunction refers to the data copy 111 of the inspection data of the terminal 21 and updates a field 112 which indicates an existence of the malfunction from "no malfunction" to "malfunction". At this time, the update log 211 is generated that indicates the field 112 of the data copy 111 of the inspection data has been updated to "malfunction", and the generated update log 211 is stored in the storage 71. When the terminal 21 and the terminal 22 perform the data transmission and reception, this update log 211 is transmitted from the terminal 21 who has detected the malfunction to the terminal 22. The update log 211 is then applied to the data copy 121 in the field 122 of inspection data of the terminal 22. The update log 211 is stored in a storage 72 of the terminal 22.

The update log 211 stored in the terminal 22 is transmitted to the other terminals in the system responding to their needs. That is, the update log 211 is transmitted from the terminal 21 directly or indirectly to the other terminals, and eventually, the update log 211 is received by all the terminals that has the copy of the inspection data, and the data corresponding to the data copy 111 of the inspection data is updated to "malfunction" in other terminals.

Figure 5:
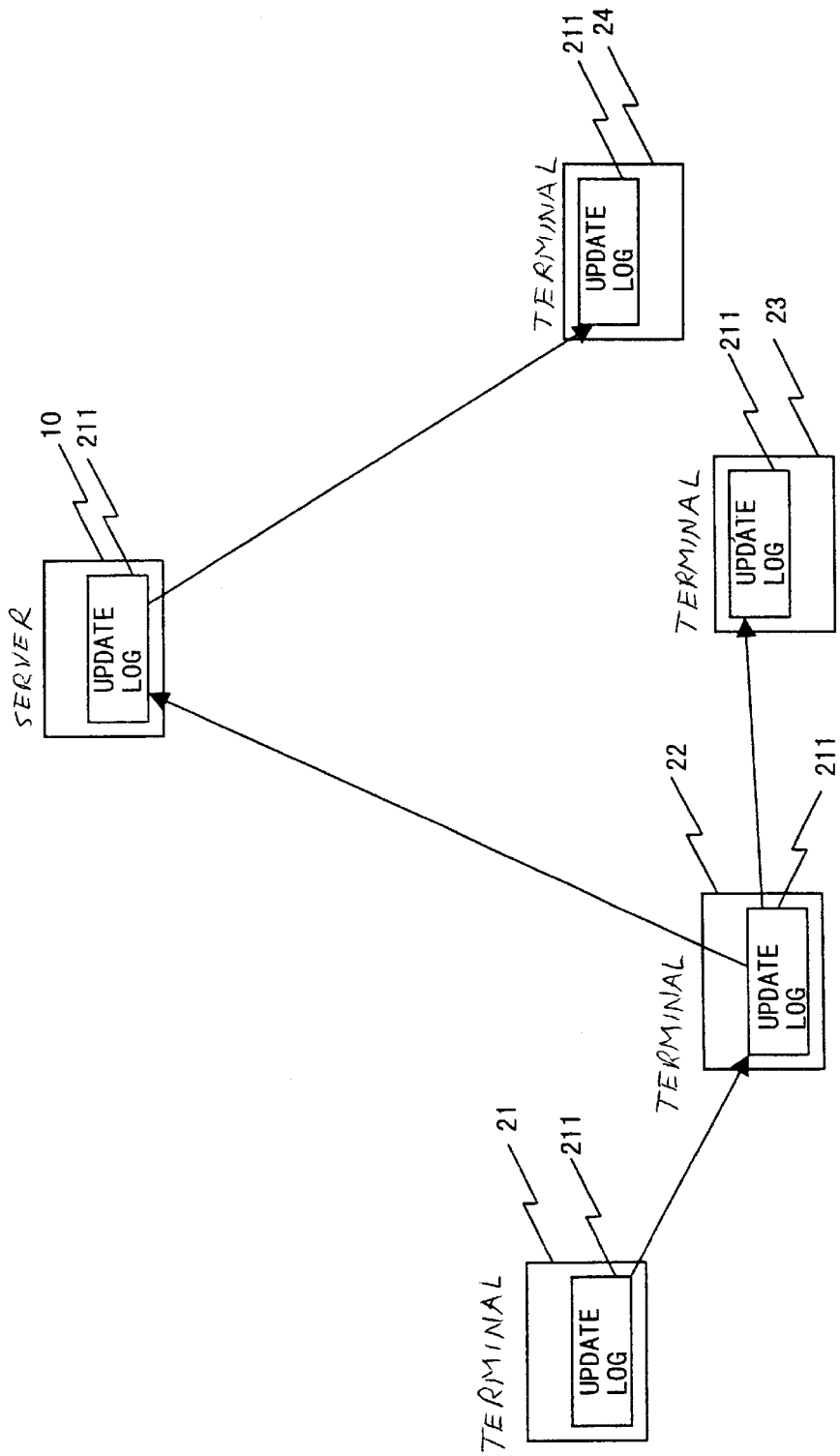
FIG. 5 illustrates an example of transmitting an update log directly or indirectly from the terminal to the other terminals.

FIG. 5 illustrates an example which simplified this situation.

There are two possible ways of transmitting the update log 211 to the other terminals or to the server, namely: a direct transmission from the terminal 21 having been updated by the update log 211; and an indirect transmission from a terminal that has received the update log 211 from the terminal 21. For both processes of the direct and the indirect transmission, by using the one-phase bit vector disclosed in the document "Dynamic Version Vector Maintenance", it is possible to verify whether the update log 211 is distributed to all the terminals or not. As an example, the update log 211 is distributed and present in all the terminals 21 to 24 and the server 10, as illustrated in the system of FIG. 5. When the situation in FIG. 5 is verified by the terminal 21 that there is no more terminal present in the system which the terminal 21 must transmit the update log 211 to, then the terminal 21 can delete the update log 211.

However, the update log is not received by a terminal that is not being used, because the unused terminal is not performing data transmission or reception with any one of the terminals nor with the server.

Figure 6:
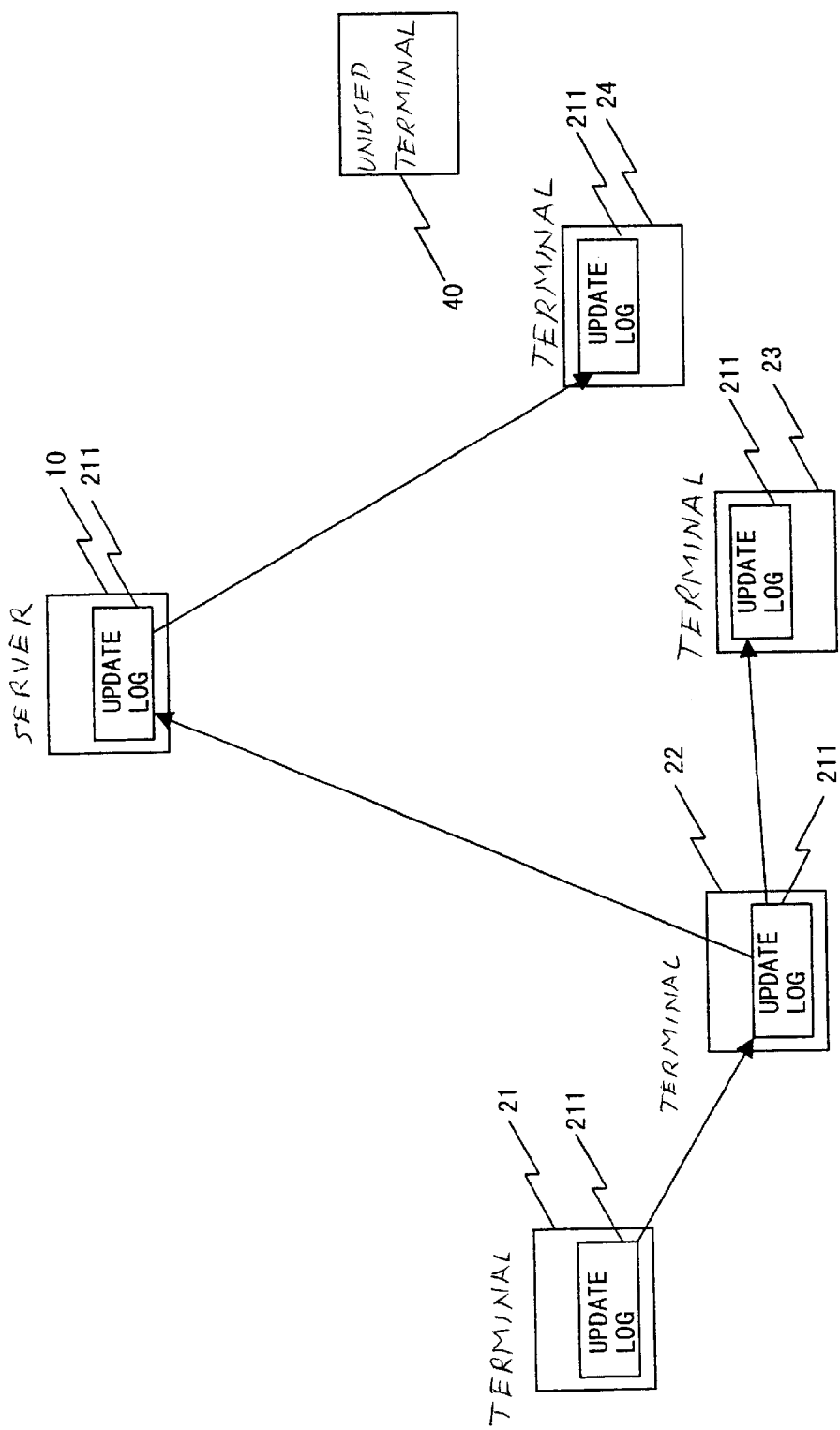
FIG. 6 illustrates a situation when an unused terminal is present in the system.

FIG. 6 illustrates the situation when the unused terminal is present in the system.

The unused terminal 40 will not receive the update log 211, therefore, the terminal 21 cannot decide that the update log 211 has been received by all the terminals in the system. When the unused terminal is present in the system, the terminal 21 cannot delete the update log 211 using the previously described method. The unused terminals can cause overloading of the memory area of each terminal in the system, because the more the unused terminals are present in a system, the greater the amount of update logs that cannot be deleted from the system than the case when there is no unused terminal present in the system.

Embodiment 1

One of the method which will be described in the present invention is a method of deleting the update log that is not verified as distributed to all the terminals without losing the aim of the present invention. The aim of the present invention is to reduce the amount of communication, and this is the reason for using the update log.

In general, if a total amount of data of the update logs exceeds an amount of the data itself, then it makes sense in terms of amount of the data transferring involved to transmit the data itself rather then transmitting and receiving the update logs. In the present invention, if the total amount of data of the update logs has been decided to exceed the amount of data itself, the terminal will transmit the data itself, not the update log. When the data itself is transmitted, the transmission data will include the data itself and a log applied information of the data itself. The log applied information is an information which indicates by how much of the update log has been applied to the data of the log storing information of each terminal as updated based on the received update applied information. If the data amount Y of the data itself in a terminal and the log applied information is less than the data amount X of the update logs, then the data itself will be transmitted. Hereinafter, this situation is referred to as (A).

As a method generally performed in the system which uses the update log, the log record information is transmitted and received between the terminals before the transmission and reception of the update log.

Figure 7:
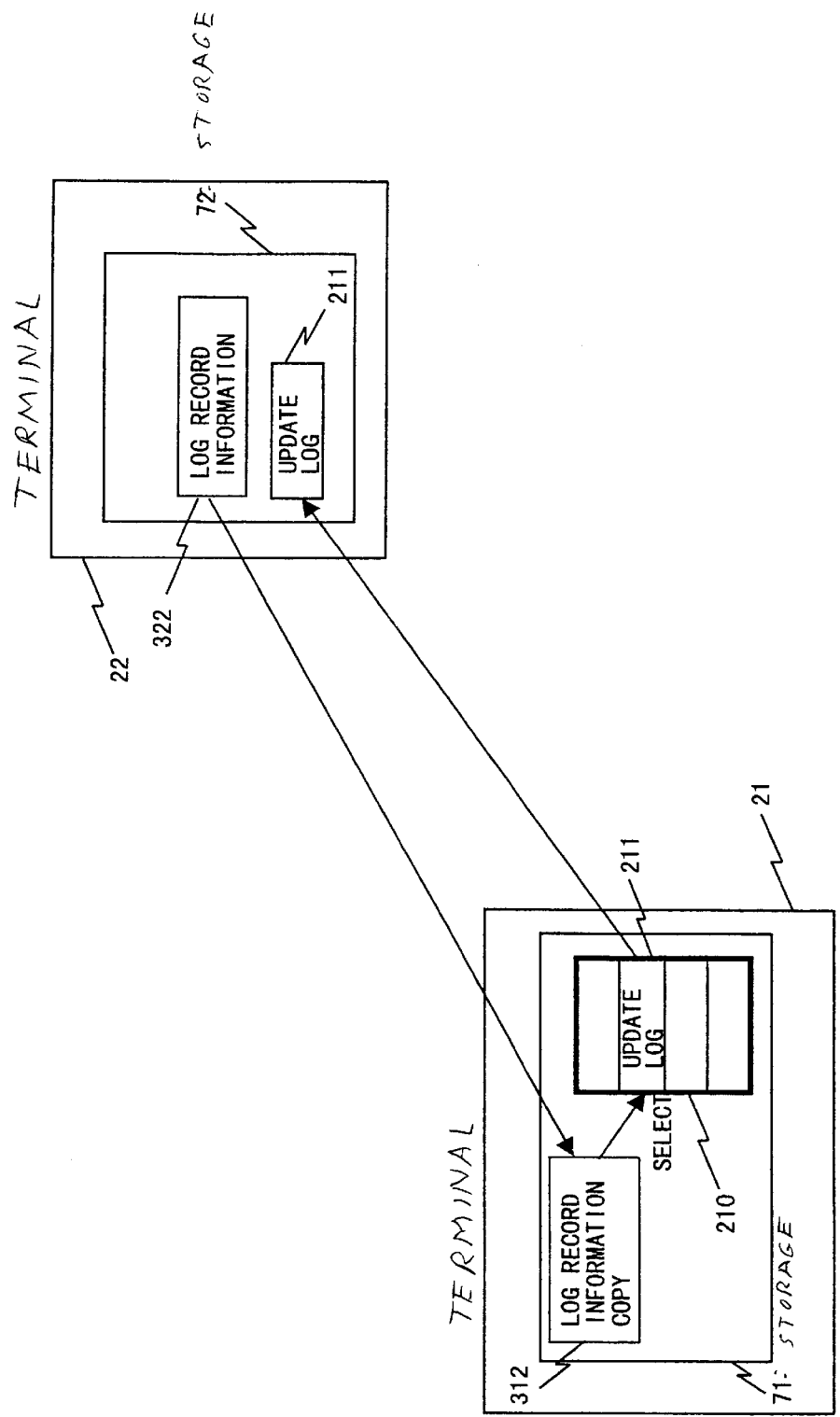
FIG. 7 outlines the transmission and reception of the update log.

FIG. 7 outlines the transmission and reception of the log record information.

The terminal 21 receives a log record information 322 from the terminal 22 and extracts the update log 211 from the update log collection 210 since the update log 211 is not stored by the terminal 22 yet. Accordingly, the terminal 21 transmits the update log 211 to the terminal 22, based on the log record information 322.

Also in a step of verifying whether or not an update log is distributed to all the terminals, an information indicating whether the update log is stored in each one of the terminals (indirect log record information) will be circulated between the terminals. The one-phase bit vector, which is described in the document "Dynamic Version Vector Maintenance", indicates whether or not each terminal agrees with a decrement of the data updating counts of a certain terminal. That is, the one-phase bit vector is nothing more than the indirect log record information. The one-phase bit vector becomes an indicator of whether or not the amount of update logs is existing in a terminal equating to a decremented amount of the updating counts, in order from the oldest update log. The one-phase bit vector is included in the version vector. When a terminal receives the version vector including the one-phase bit vector, the terminal will copy the received version vector to its own version vector, and updates the copied version vector responding to needs. This way, the one-phase version vector will be circulated between the terminals. The one-phase bit vector performs the decrement process of the updating counts at one-phase, which should have been performed at two-phases. Even in cases of not using the method of one-phase bit vector, in other words, the method of using the two-phases, an agreement in the decrement and the decrement verification will be transmitted between the terminals. Similarly, the update logs that are present in the terminal will be known.

Figure 8:
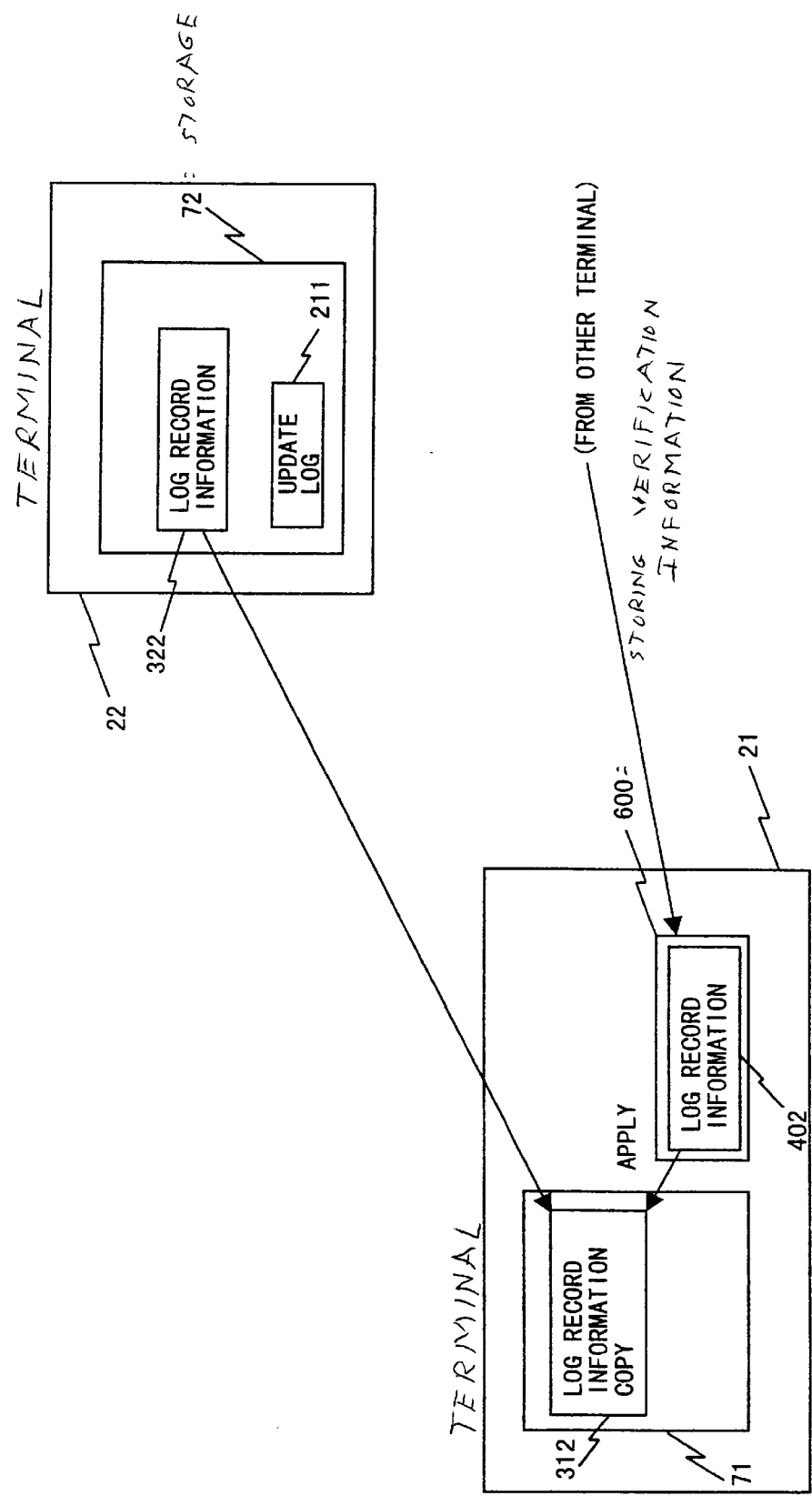
FIG. 8 outlines the storing of a log record information and an indirect log record information.

FIG. 8 outlines the storing of the indirect log record information and the log record information.

The terminal 21 receives the log record information 322 transmitted from the terminal 22 by the direct data transmission and reception. The log record information 322 is recorded in the terminal 21 as a log record information copy 312. In the step of verifying whether the update log 211 is distributed to all the terminals, when the terminal 21 receives a storing verification information 600 from the other terminal, which is used for a purpose of verifying, and if this storing verification information 600 includes an indirect log record information 402 of the terminal 22, then a content of the indirect log record information 402 is applied to the log record information copy 312 of the terminal 22 at the terminal 21. Due to this, the latest log record information copy of each terminal is obtained as far as possible at the terminal 21.

The terminal 21 can assume the update logs that need be transmitted to the terminal 22 from the log record information copy 312 of the terminal 22 stored in the terminal 21. The log record information copy 312 of the terminal 22 stored in the terminal 21 is not same as the log record information 322 of the terminal 22, but it shows a status at certain point in the past, therefore, the update logs extracted by the log record information copy 312 of the terminal 22 in the terminal 21 will be the maximum amount of the update logs that are ready for transmitting when the data transmission and reception with the terminal 22 occurs.

There are two cases when the update log 211 stored in the terminal 21 does not need to be transmitted to other terminals when the terminal 21 stores the log record information of the other terminals and the indirect log record information of the other terminals. These are: (1) cases when the other terminals are already storing the update log 211; and (2) cases when (A) is established. That is, to those terminals that have directly transmitted and received the data itself, the update log does not need to be transmitted as long as one of (1) and (2) is satisfied.

Figure 9:
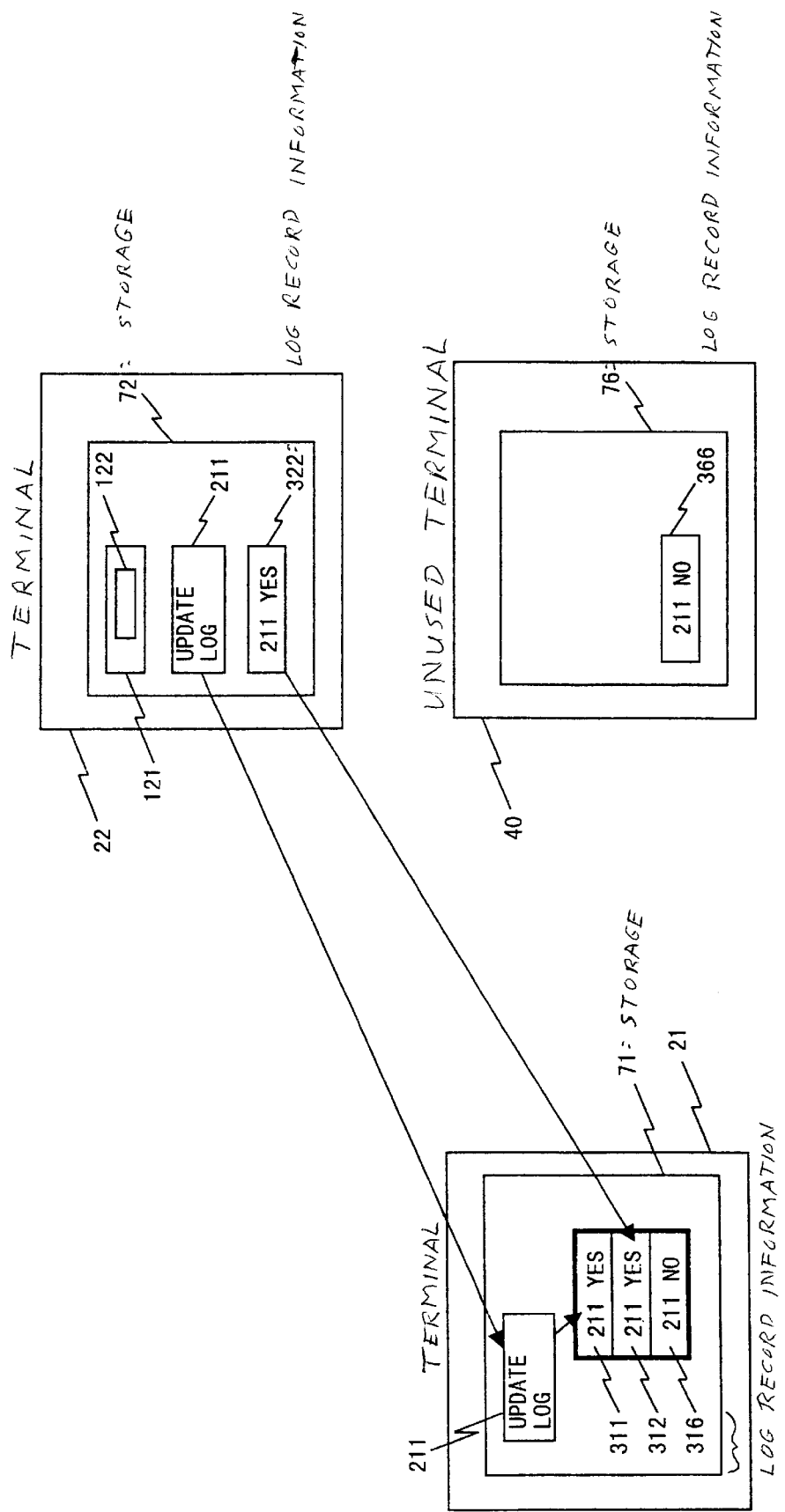
FIG. 9 outlines a deletion method of the update log.
Figure 10:
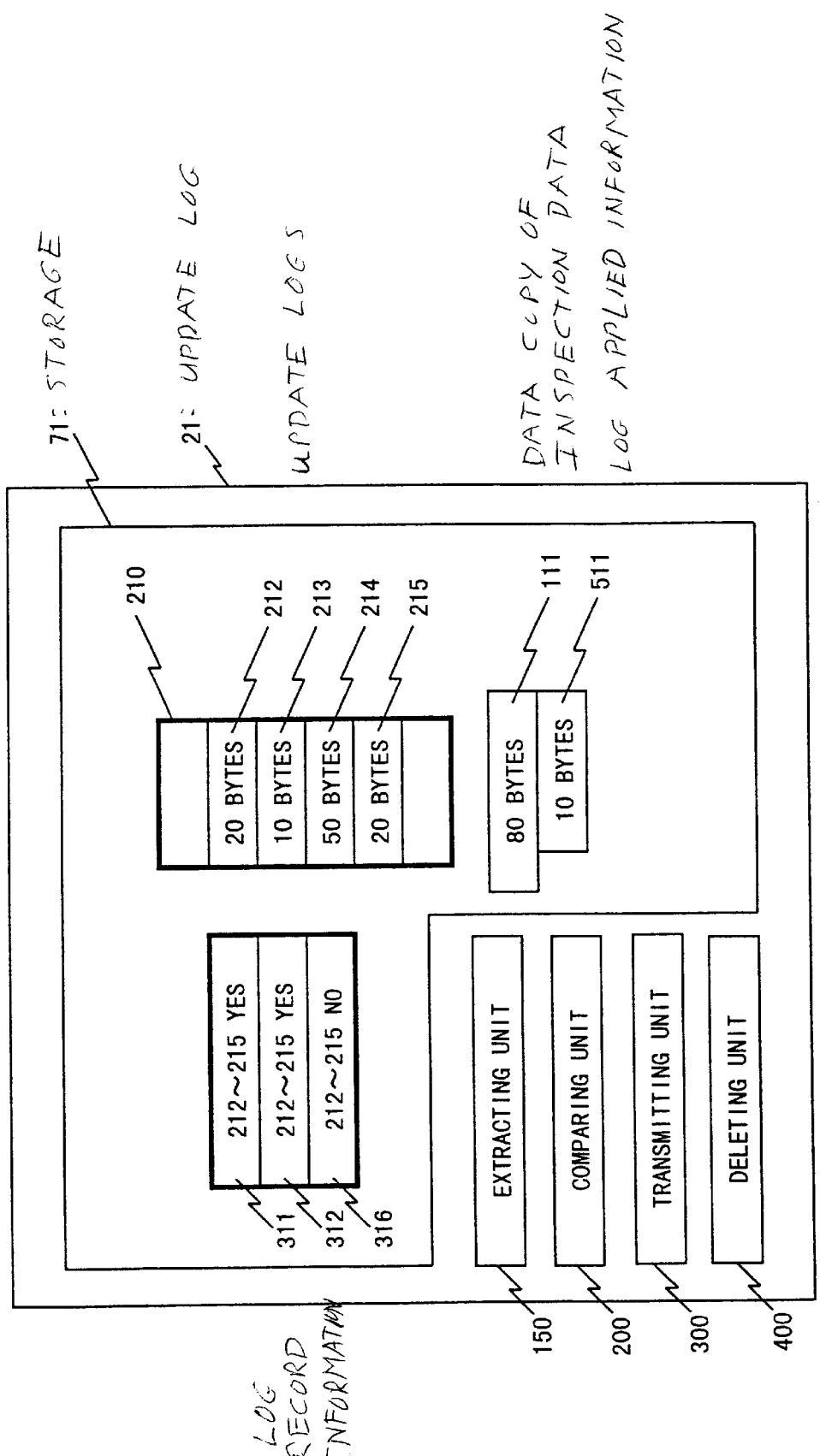
FIG. 10 outlines the deletion method of the update log.

FIGS. 9 and 10 outline the deletion method of the update log by using the previously described method.

As illustrated in the drawing of FIG. 9, a log record information copy 316 of an unused terminal 40, the log record information copy 312 of the terminal 22, and the log record information 311 of the terminal 21 are present in the terminal 21. When the field 122 indicating the existence of the malfunction in the data copy 121 of the inspection data is updated to "malfunction" at the terminal 22, the update log 211 indicating this update arrives to the terminal 21 at some point. When the update log 211 is received by the terminal 21, the log record information 311 of the terminal 21 is updated to indicate the presence of the update log 211.

On the other hand, since the unused terminal 40 is not being used, the unused terminal 40 will not receive the update log 211. That is, the log record information 366 in a local storage 76 of the unused terminal 40 will not indicate that the update log 211 is received. The log record information copy 316 of the unused terminal 40 in the terminal 21 remains to be in a status of the past log record information 366 of the unused terminal 40, therefore, the log storing information does not indicate that the update log 211 is received by the unused terminal either.

The drawing of FIG. 10 illustrates the data copy 111 of the inspection data of the terminal 21 and a part of the update log collection related to the data copy 111 of the inspection data, as of FIG. 9.

Figure 24:
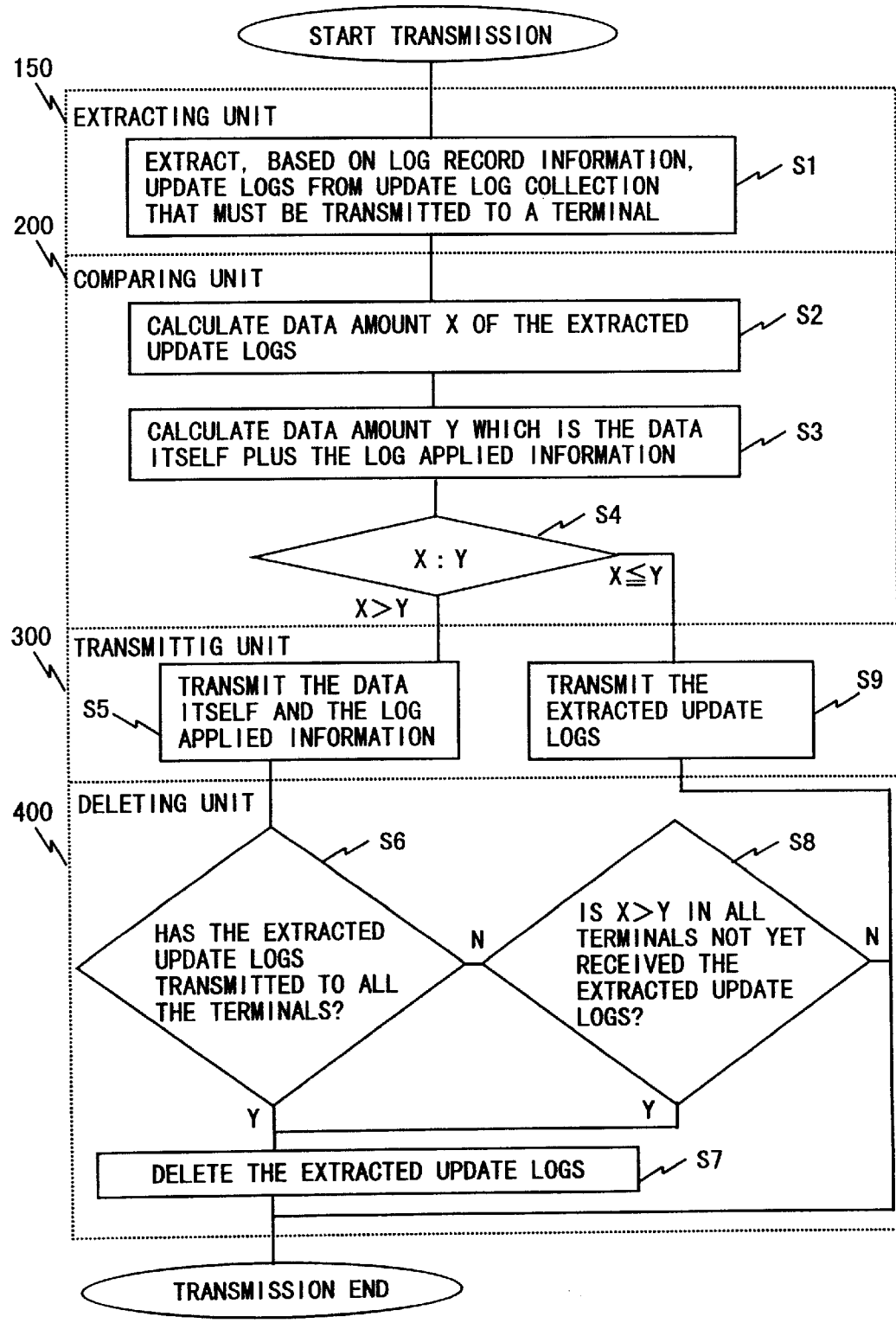
FIG. 24 illustrates a flow chart of transmission operation.

FIG. 24 illustrates a flow chart of the transmission operation.

The log record information copy 316 of the unused terminal 40 in the terminal 21 indicates that the unused terminal 40 has not stored the update logs 212 to 215. An extracting unit 150 assumes that the update logs that must be transmitted to the unused terminal 40 at this point are the update logs 212 to 215. Then the update logs 212 to 215 are extracted from the update log collection 210 (step S1). A comparing unit 200 calculates data amount X of the update logs 212 and 215 (step S2). In the example of FIG. 10, the total data amount X of the update logs 212 to 215 is 100 bytes.

Next, the comparing unit 200 obtains data amount Y which is an addition of data amount of a log applied information 511 and a data amount of the data copy 111 of the inspection data (step S3). The data amount of the data copy 111 of the inspection data is 80 bytes, and the log applied information 511 related to the data copy 111 of the inspection data is 10 bytes, and this gives a total of data amount Y of 90 bytes. This means that the amount of transmission data will be less by transmitting the data copy 111 of the inspection data and the log applied information 511 rather than transmitting the update logs 212 to 215. In other words, the situation here satisfies (A), i.e. X>Y. Due to this, the update logs 212 to 215 are decided to be the update logs that does not need to be transmitted to the unused terminal 40 (step S4).

Next, a transmitting unit 300 transmits the data copy 111 of the inspection data and the log applied information 511 to the unused terminal 40 (step S5).

On the other hand, a data copy 312 of the log record information of the terminal 22 indicates that the terminal 22 stores the update logs 212 to 215, therefore, there is no need to transmit the update logs 212 to 215 to the terminal 22. In step S6, a deleting unit 400 decides that the update logs 212 to 215 are not required to be transmitted to any of the terminals, and in step S7 deletes the update logs 212 to 215 from the terminal 21. Even if it was decided that the update logs 212 to 215 are required for transmission to the unused terminal 40, if X>Y establishes for all other terminals, the update logs 212 to 215 are deleted from the terminal 21 (steps S8 and S7).

If X≦Y is established in step S4, that is, if the situation is found not to satisfy (A) in the comparing unit 200, then in step S9 the transmitting unit 300 transmits the update logs 212 to 215 to the unused terminal 40.

In general, a copy of the log record information of a second terminal stored in a first terminal is an older information compared to an actual log record information of the second terminal. That is, the amount of update logs extracted from the update log collection by the log record information copy of the second terminal in the first terminal may be less than the amount of actual update logs transmitted to the second terminal from the first terminal upon the actual data transmission and reception. In this case, in spite of the decision being made as to the amount of data transferring will be less for transmitting the data itself rather than transmitting the update log, but actually, the amount of data transferring will be less for transmitting the update log, and an unexpected increase in the amount of data transferring may result. However, this method is sufficient for a circumstance described below.

Figure 12:
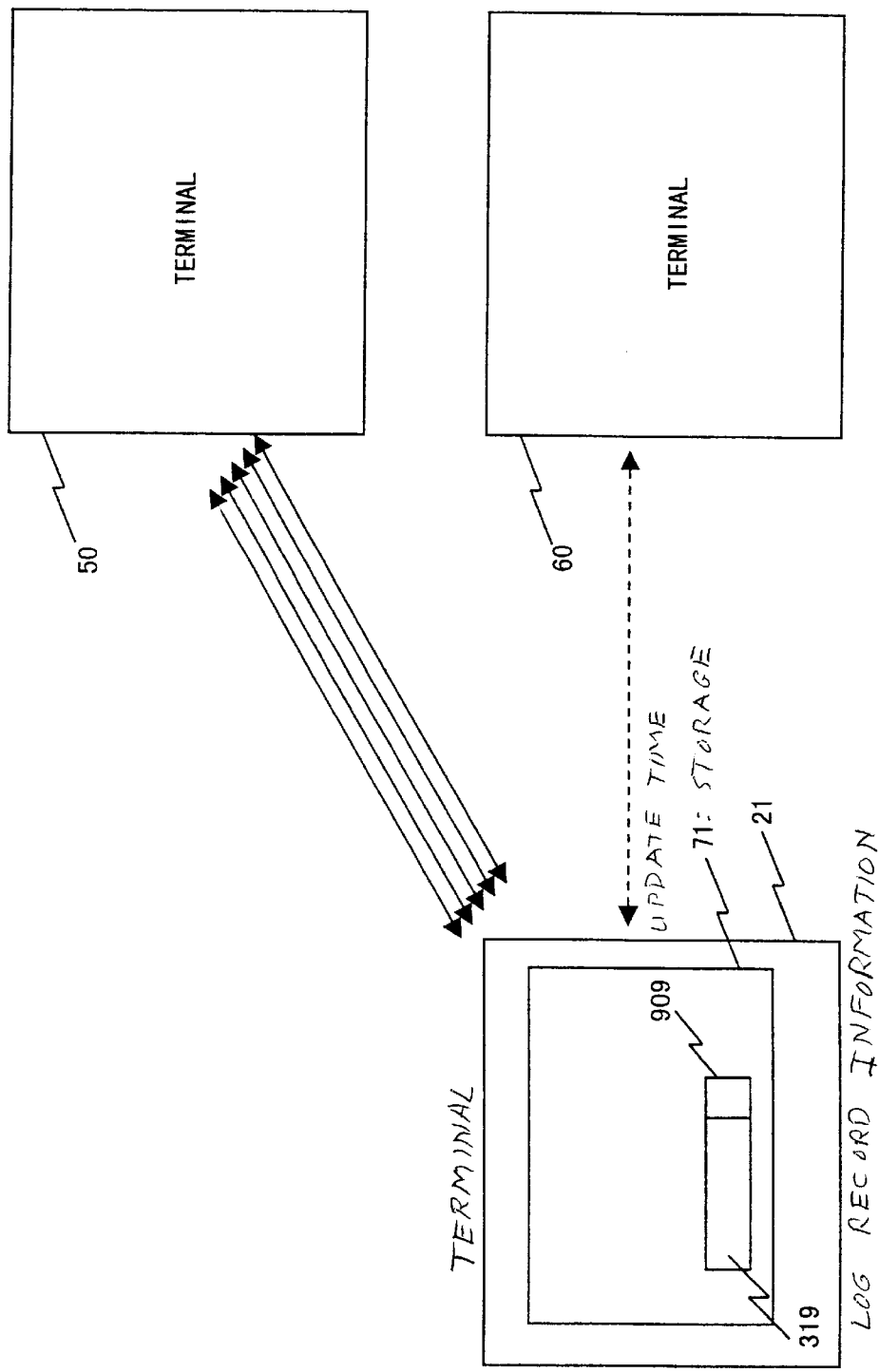
FIG. 12 illustrates a terminal which frequently transmits and receives data and a terminal which does not frequently transmits and receive data.

The drawing of FIG. 12 illustrates a case when a frequent data transmission and reception is occurring only between the terminal 21 to the terminal 50 and when a rare data transmission and reception is only occurring between the terminal 21 to the terminal 60. The log record information copy of the terminal 50 frequently transmitting and receiving the data will be more frequently updated than the log record information copy of the terminal 60. Under such circumstance when the log record information copy 319 in the terminal 21 is not updated for a long period of time, one can assume that the log record information copy 319 either belongs to the terminal 50 that became unused or it belongs to the terminal 60. The data transmission and reception with the terminal indicated by the log record information copy 319 will occur after deleting an update log according to the log record information copy 319. Therefore, the chance of an unexpected increase in the amount of data transferring is small, and an increase in the data transmission and reception in a whole system is low.

Updated times 906 and 909 shown in the drawings of FIGS. 11 and 12 will be described in detail in the embodiment 2.

Figure 25:
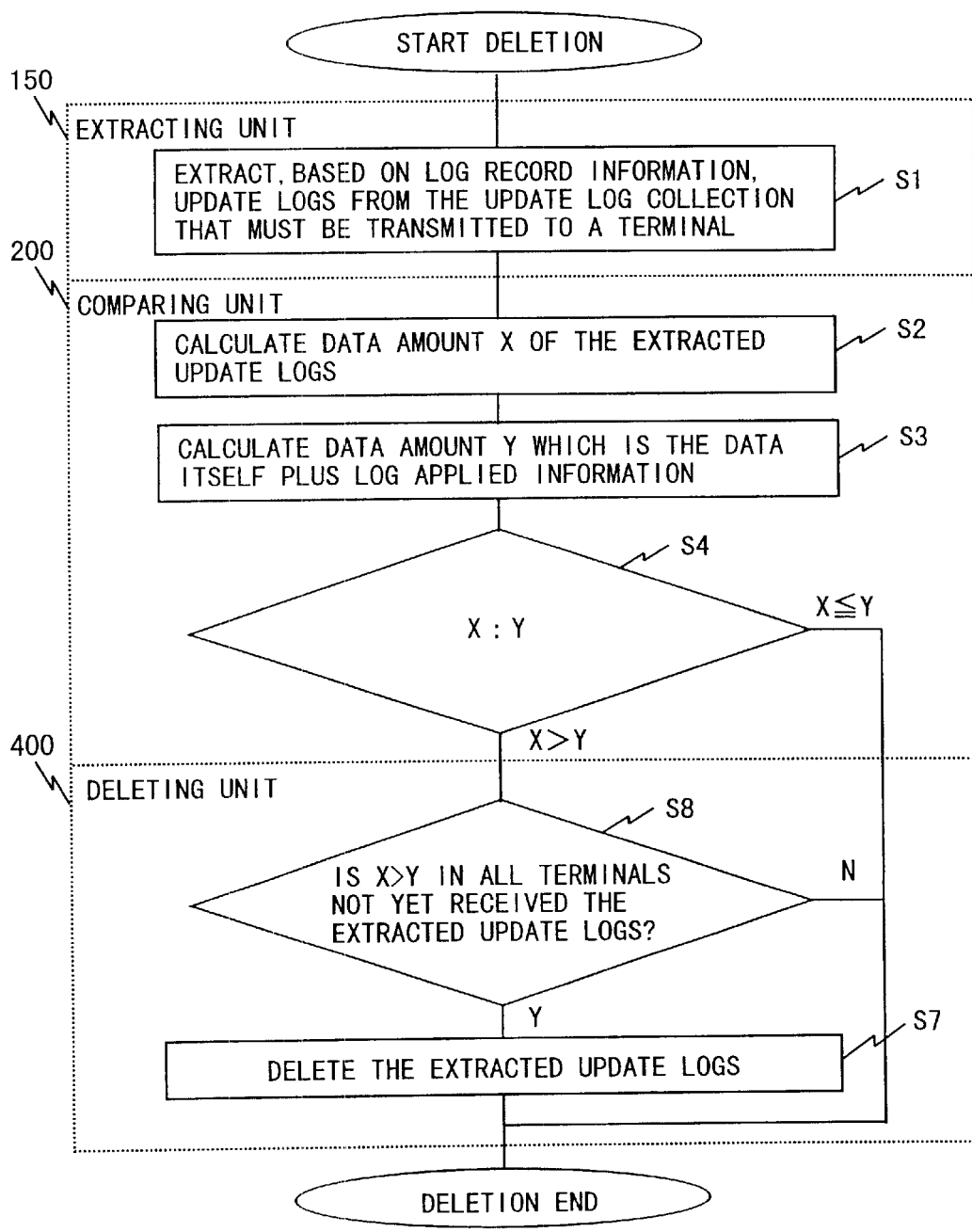
FIG. 25 illustrates a flow chart of deletion operation.

The flow chart of FIG. 24 is a process that deletes the update logs during the transmission process. Alternatively, the deletion process can be executed routinely or periodically as illustrated in FIG. 25.

Embodiment 2

One more method for deleting the update log is described in this embodiment. This is a method to reduce the amount of update logs required for storing in a terminal by excluding a specific terminal from a future data transmission and reception.

Figure 11:
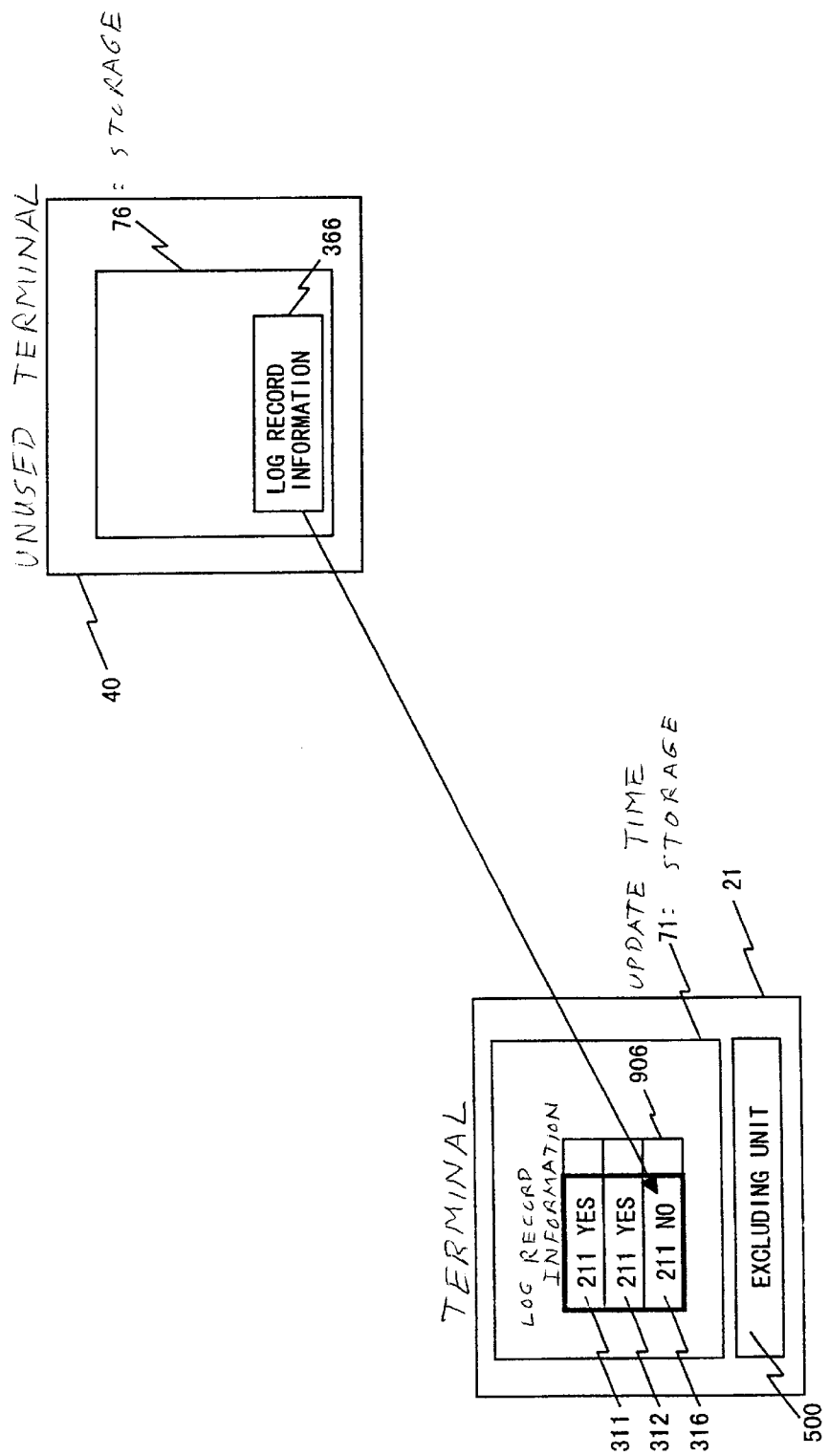
FIG. 11 outlines the exclusion of a specific terminal from a future data transmission and reception.

FIG. 11 outlines the present embodiment.

The terminal 21 records an updated time 906 which is a time when the log record information copy 316 of the terminal 40 is updated. This update of the log record information copy 316 occurs when the terminal 21 receives the log record information 366 from the terminal 40, or when an indirect log record information 406 of the terminal 40 is included in the storing verification information 600. An excluding unit 500 of the terminal 21 deletes the log record information copy 316 of the terminal 40 from the terminal 21 if no update is made on the log record information copy 316 of the terminal 40 during a time limit starting from the last updated time 906 of the log record information copy 316 of the terminal 40. Alternatively, the time limit can be determined based on the different types of terminals.

To give some examples of what kinds of time limit are being used in deciding such deletion, there is a value corresponding to a physical time such as one week, or a value virtually corresponding to a time such as after a predetermined updating counts.

In the drawing of FIG. 11, say if the terminal 40 is not being used, then the log record information 366 in the terminal 40 will not be transmitted to other terminals after the terminal 40 became unused. In addition, the terminal 40 will not receive the storing verification information 600 after it became unused, and the indirect log record information 406 will not be transmitted. Therefore, when all the information related to the log record information 366 transmitted from the terminal 40 before the terminal 40 becomes unused are received by the terminal 21, then there will be no more update of the log record information copy 316 occurring after that.

In the present embodiment, when the time limit of no updating of the log record information copy 316 of the terminal 40 in the terminal 21 expires, the terminal 21 deletes the log record information copy 316. Due to the deletion of the log record information copy 316, only the log record information copy 312 of the terminal 22 is present in the terminal 21. The log record information copy 312 indicates that the terminal 22 stores the update log 211, therefore, the terminal 21 can delete the update log 211 which enables to decrease the amount of data stored in the terminal 21.

This deletion method assumes a terminal where the update of log record information copy does not occur during the time limit as having become unused. However, there are cases that this assumption is not true, such that the deleted update log cannot be restrained as will not be subjected to the future data transmission later on. If the deleted update log happens to be subjected to the data transmission, then the update log cannot be transmitted because the update log is no longer available in a terminal, so the data itself is transmitted instead in such cases.

However, as in the drawing of FIG. 12, for the cases when the data transmission and reception frequently occurs between the terminal 21 and a terminal 50, and when the data transmission and reception rarely occurs between the terminal 21 and the terminal 60, comparing the log record information copy of the terminal 50 which is frequent and the log record information copy of the terminal 60 which is not so frequent, the updating is frequent for the log record information copy of the terminal 50. Under such circumstance, if the log record information copy 319 stored in the terminal 21 is not updated for a long period of time, either one of the following is the case: a terminal indicated by the log record information copy 319 is the terminal 50 which has become unused; or a terminal indicated by the log record information copy 319 is the terminal 60. Accordingly, at any case, a possibility of the data transmission and reception with the terminal indicated by the log record information copy 319 not occurring is low. The possibility of the data transmission and reception not occurring will become even lower by setting an optimum value of the time limit for deleting the log record information based on rule or experiment from the operation and the data format. If no update is made on the log record information copy 319 in the terminal 21 during the optimum time limit starting from the last updated time 909 of the information storing copy 319, then the excluding unit of the terminal 21 deletes the log record information copy 319. This way, the amount of data for storing is deleted at the same time as suppressing an increase in the amount of data transmission and reception.

Embodiment 3

A method of selective recording the received log record information is described as another embodiment of the present invention. This is not a method of deleting the already recorded log record information as in the embodiment 2.

Figure 13:
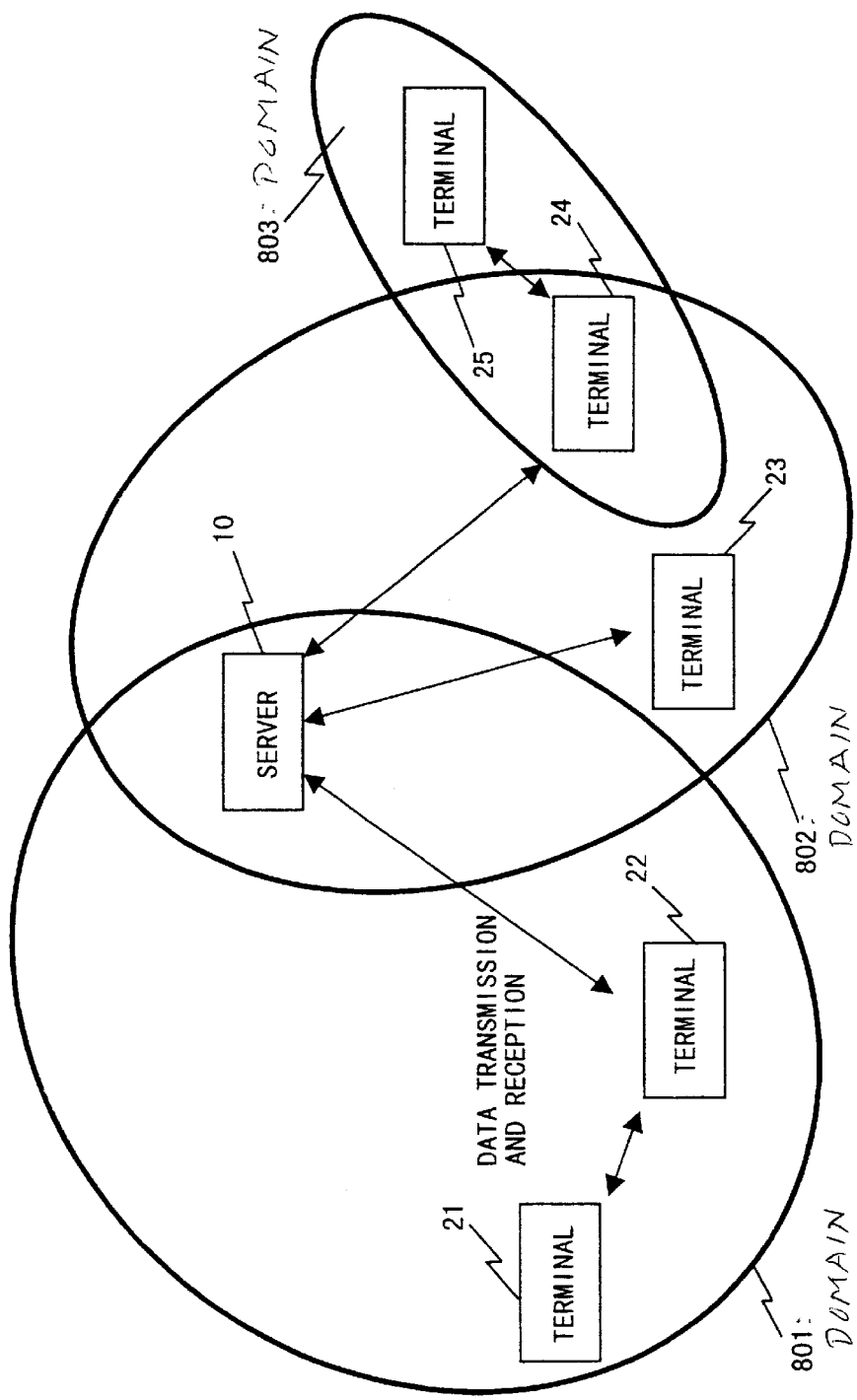
FIG. 13 outlines the domains.

FIG. 13 illustrates a concept of domains.

In the drawing of FIG. 13, the terminals 21 to 25 are divided into domains 801 to 803 in accordance to the groups of inspectors. The terminals 21 to 25 record which domain they belong to, respectively. A procedure to record which domain a terminal belongs to is performed statically before commencing all data transmission and reception, or performed dynamically at some point in time. Alternatively, a procedure to withdraw from a domain can be performed. In addition, a single terminal can belong to a plurality of domains.

Figure 14:
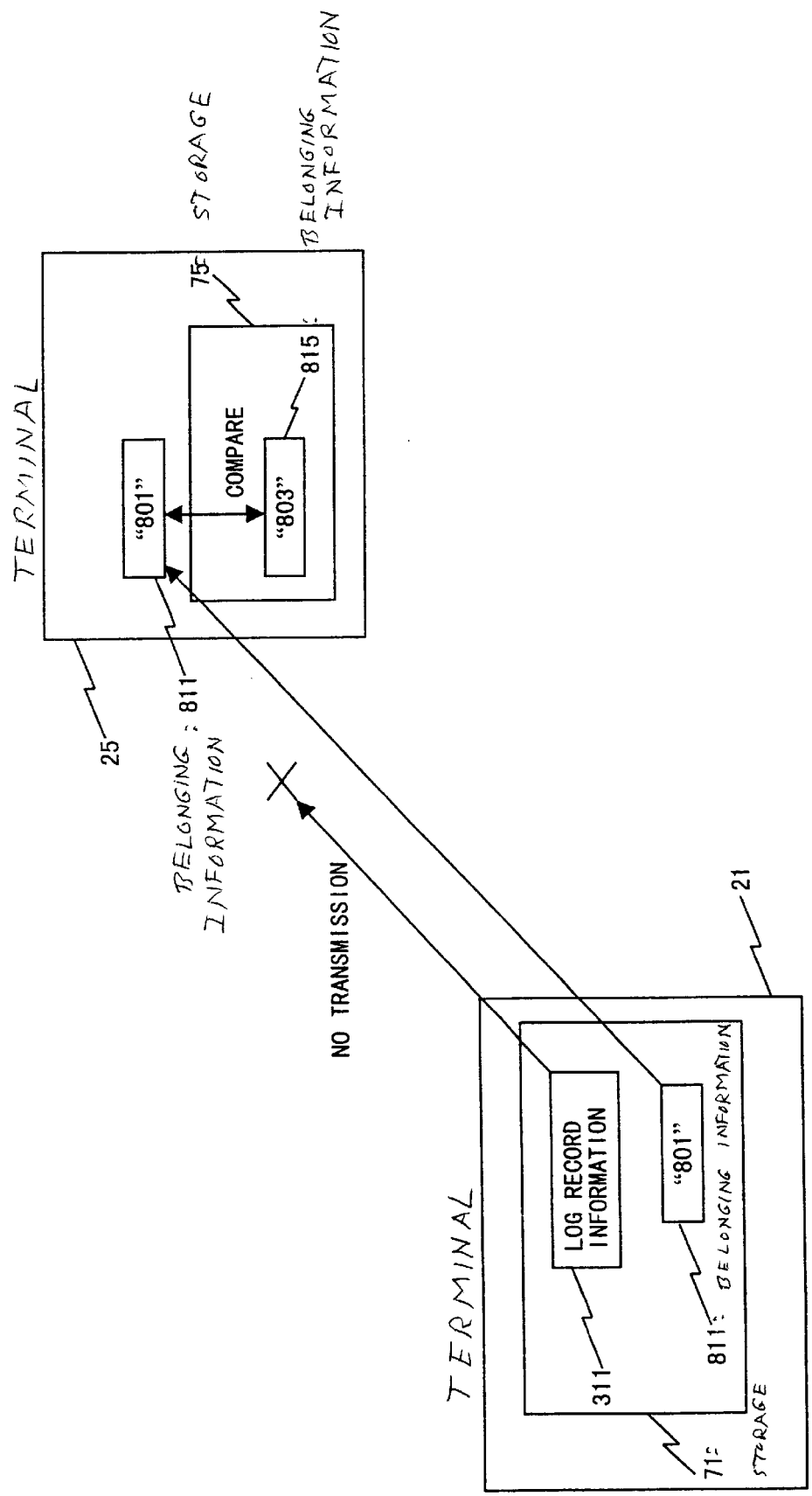

In the drawing of FIG. 14, the terminal 21 transmits a belonging information 811 to a communication terminal which is a terminal 25. The belonging information 811 is an information indicating that the terminal 21 belongs to the domain 801. The terminal 25 belongs to both the domains 802 and 803. The terminal 25 compares the belonging information 811 and a belonging information 815 in the local storage 75 of the terminal 25, and determines whether or not the terminal 21 belongs to either one of the domains 802 and 803. In cases when a communication terminal does belong to one of the domains belonged by a first terminal itself, then the first terminal will transmit and receive data with the communication terminal. In cases when a communication terminal belongs to none of the domains belonged by a first terminal, then the data transmission and reception will not take place between the first terminal and the communication terminal. In the case of FIG. 14, since the domains 802 or 803 which the terminal 25 belongs to are not included in the belonging information 811, therefore, the terminal 25 will not perform the data transmission and reception with the terminal 21. Accordingly, the log record information 311 of the terminal 21 is not recorded in the terminal 25.

In addition, the belonging information is also added to a storing verification information. A first terminal belonging to a certain domains does not record the indirect log record information of a second terminal that belongs to none of the domains belonged by the first terminal.

Figure 15:
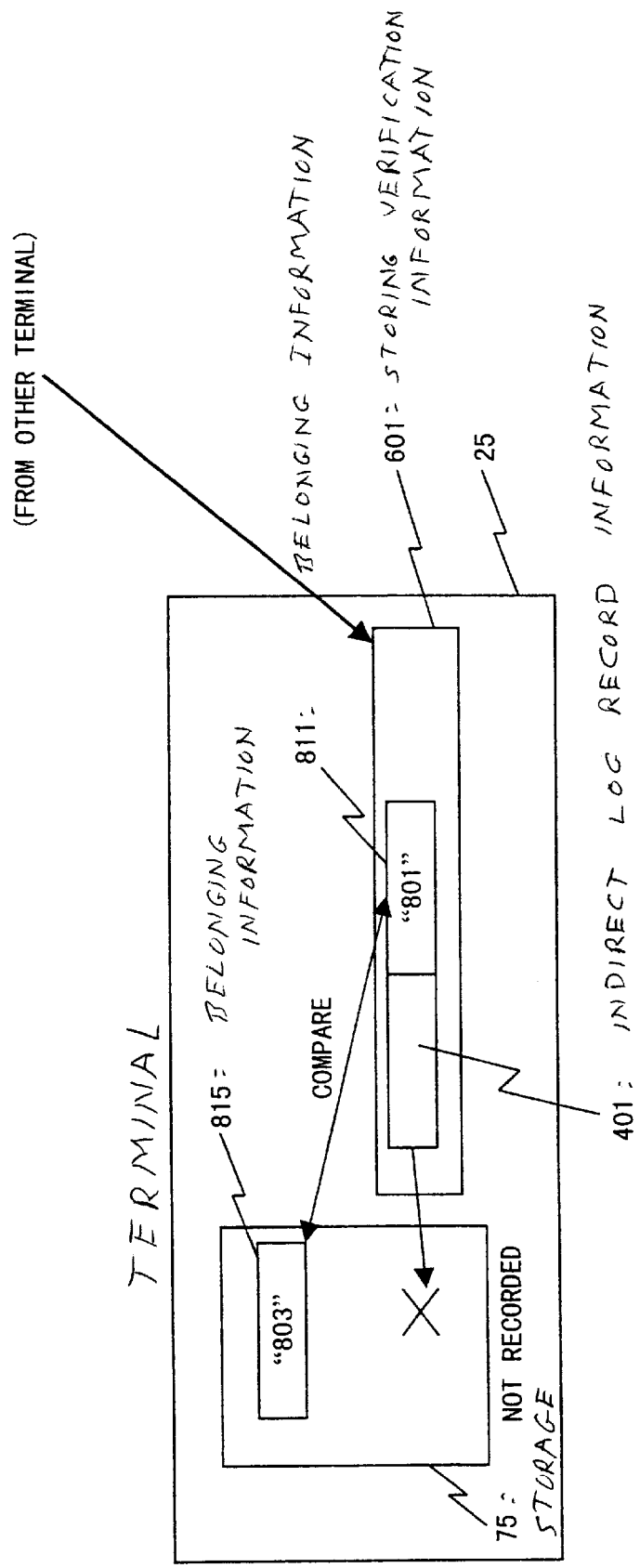
FIG. 15 illustrates an example of storing a verification information attached by the belonging information.

FIG. 15 is an example of storing verification information with attached belonging information.

In the drawing of FIG. 15, the terminal 25 receives the storing verification information 601. At this time, the storing verification information 601 includes the indirect log record information 401 and the belonging information 811 of the terminal 21. Since the domain 803 which the terminal belongs to is not included in the belonging information 811, the terminal 25 does not record an indirect log record information 401.

Accordingly, the amount of the log record information copies stored in a terminal belonging to some domains are much less than the amount of log record information copies of all the terminals stored in a terminal that does not belong to any of the domains. In general, for a terminal where the amount of log record information copies stored is small, an amount of update logs for storing in the terminal is also small. This is because in order to delete the update log, all log record information copies must be referred to see if these are verified to agree with deletions (i.e., all terminals store the update logs), or if there is no problem by deleting as in the manner described in the embodiment 1. Therefore, when the log record information copies keep on increasing, the terminal that need to obtain this agreement increases by the increased amount of the log record information copies, and, a constraint condition for deciding the deletion will also increase.

As illustrated in the drawing of FIG. 13, when the terminals 21 and 22 belong to the domain 801 but the terminal 23 does not belong to the domain 801, the terminal 21 performs data transmission and reception with the terminal 22, and stores the log record information copy 312 of the terminal 22. But the terminal 21 will not perform the data transmission and reception with the terminal 23 which does not belong to the domain 801, nor does it stores the log record information copy of the terminal 23.

Figure 16:
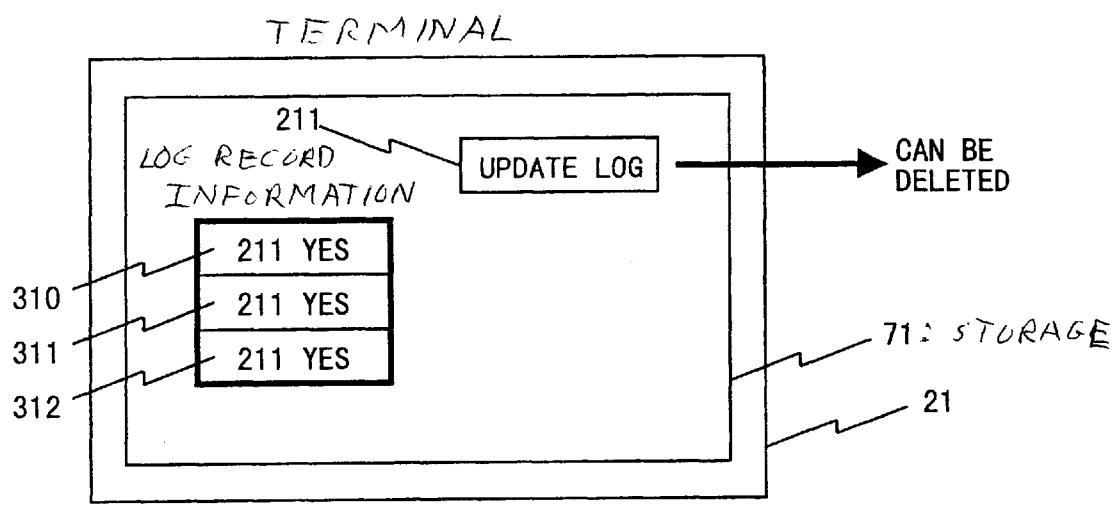
FIG. 16 illustrates a case of deleting the update log since the server and all other terminals in the domain store the update log.

In the drawing of FIG. 16, both the log record information copy 312 of the terminal 22 and the log record information copy 310 of the server 10 indicates as storing the update log 211. This means the other terminals and the server in the domain 801 stores the update log 211, so the terminal 21 can delete the update log 211. On the other hand, when not using the domain concept, the terminals 21 to 24 perform the data transmission and reception mutually. When the log record information copy 312 of the terminal 22 and the log record information copy 313 of the terminal 23 are present in the terminal 21, and if the log record information copy 313 indicates that update log 211 is not stored in the terminal 23 (see FIG. 17), then the terminal 21 cannot delete the update log 211.

Embodiment 4

Figure 18:
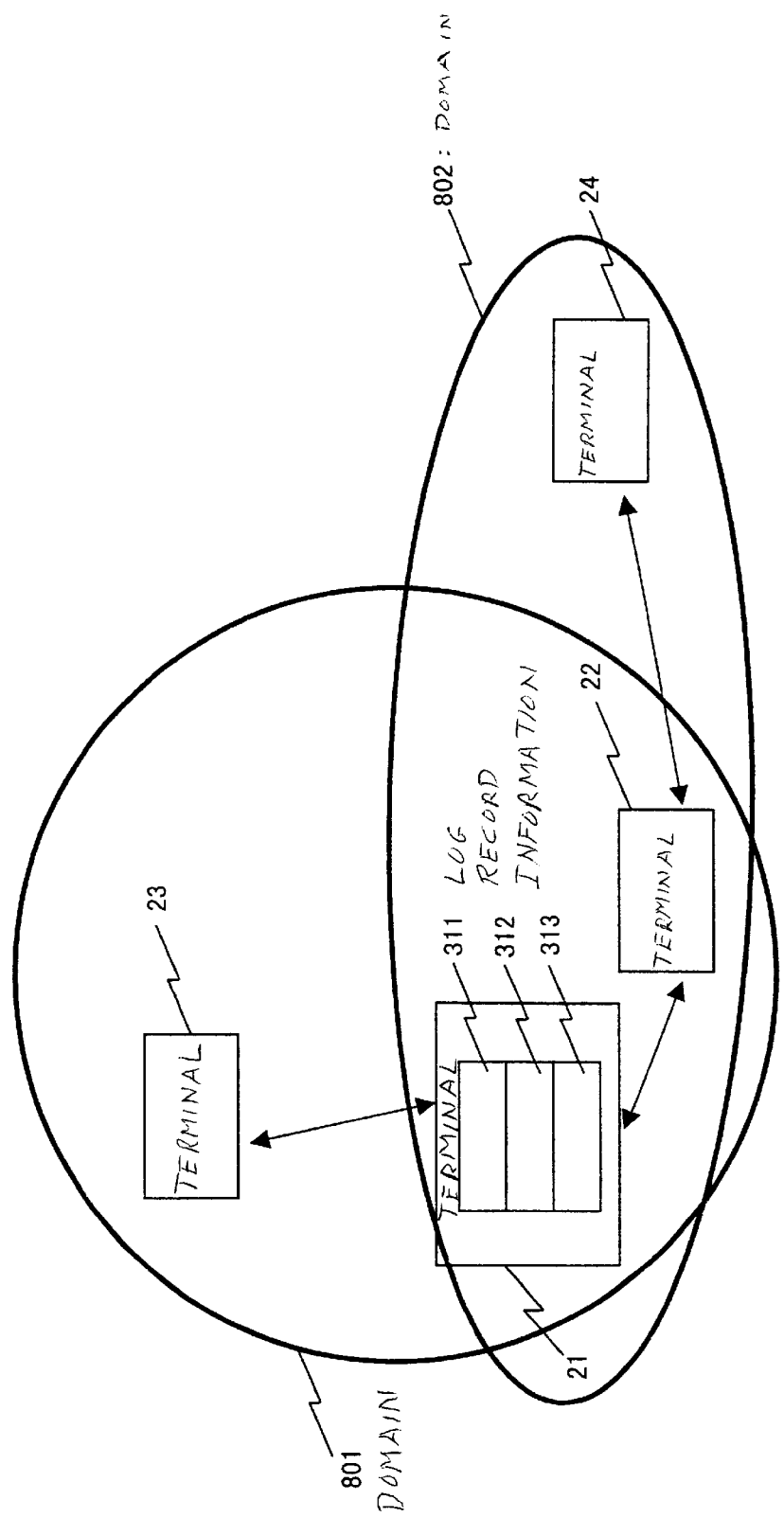
FIG. 18 illustrates an example where terminals where the data transmission and reception takes place only are recorded as a domain.

A case that a terminal that belongs to a domain registers terminals that belongs to the same domain, upon performing the data transmission and reception, is described in FIG. 18.

The terminals 22 and 23 directly perform data transmission and reception with the terminal 21, and these terminals belong to the domain 801. Likewise, the terminals 21 and 24 which directly perform data transmission and reception with the terminals 22, and these terminals belong to the domain 802.

Previous to a data transmission and reception between a first terminal which belongs to a domain and a second terminal, the second terminal must carry out a procedure for registering the domain. This procedure can be performed statically before commencing all the data transmission and reception, or can be performed dynamically immediately before performing the data transmission and reception. Also, for those terminals that are no longer requiring to transmit and receive data in the domain, a procedure to withdraw from the domain can be performed.

As can be seen from the embodiment 3, the terminal that belongs to a domain will not perform the data transmission and reception with the terminal not belonging to the same domain, nor does it stores the log record information of the terminal not belonging to the same domain. Accordingly, a terminal belonging to a domain only stores the log record information of another terminal that directly transmits and receives the data with its own terminal.

In the drawing of FIG. 18, the terminal 21 that belongs to the domain 801 only perform data transmission and reception between the terminal 23 and the terminal 22 both belonging to the same domain 801. Also, the terminal 21 stores the log record information copy 312 of the terminal 22, and the log record information copy 313 of the terminal 23, but the log record information of other terminals are not stored. Accordingly, the terminal 21 can delete the update logs only based on the log record information 312 and 313.

In general, a transmission speed of the log record information of the terminal that directly transmits and receives the data is higher than the transmission speed of the indirect log record information that does not directly perform the data transmission and reception. This is because as opposed to the direct transmission and reception of data where the most recent log record information of a terminal is transmitted, the indirect log record information being transmitted by the indirect data transmission and reception is a result of attempt to delete the update log which commenced at a certain point in time in the past, therefore, the transmitted indirect log record information may not necessary be the most recent one.

Accordingly, when a terminal that has only the log record information of the terminal that directly performs the data transmission and reception is compared with a terminal that stores the indirect log record information of terminal not directly performing the data transmission and reception of the terminal, it is found that a period of deleting an update log after receiving the update log is shorter for the a terminal that has only the log record information of the terminal that directly performs the data transmission and reception, and also an amount of the update logs required for storing in this terminal is found to be smaller.

Embodiment 5

An example of deleting the update log that need be stored in a terminal is described when the terminal which was being used has become unused. This is done by informing to the other terminals that the terminal has became unused and by deleting the log record information stored in the informed terminals.

Figure 17:
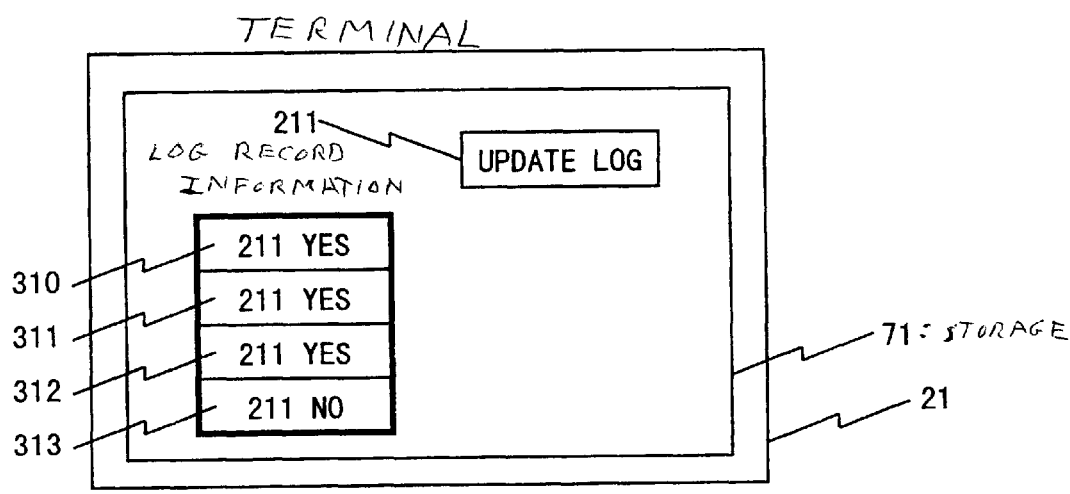
FIG. 17 illustrates a case of deleting the update log is not possible since a log record information copy does not store the update log.

As described in the drawing of FIG. 17, the log record information copies 310 to 312 indicate that the update log 211 is stored at the server and the terminals 21 and 22, but the log record information copy 313 indicates that the update log 211 is not stored in the terminal 23, therefore, the terminal 21 cannot delete the update log 211.

The present embodiment assumes that the terminal 23 which was being used has become unused.

Figure 19:
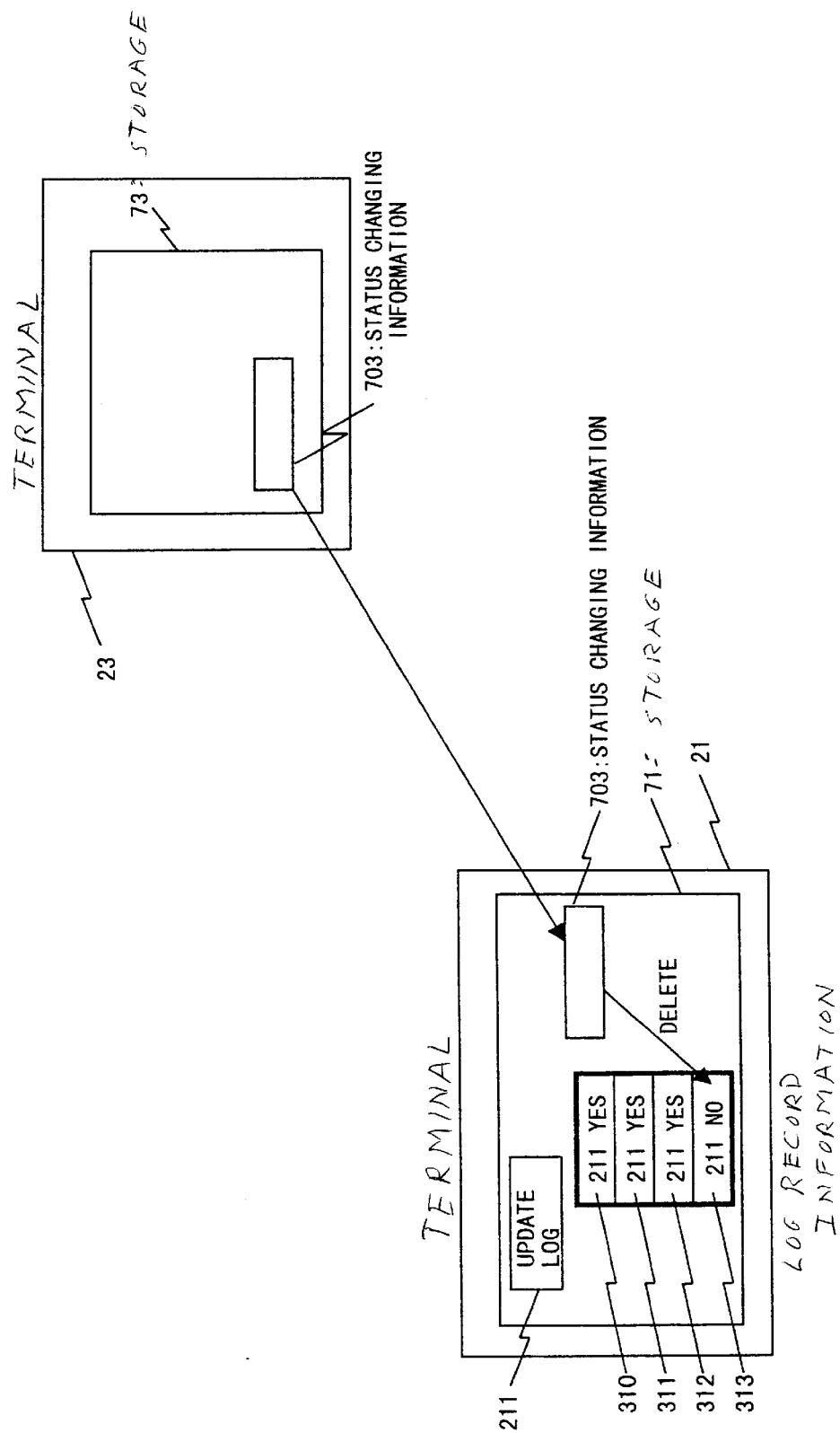
FIG. 19 outlines the processing of a terminal which was being used has become unused.

FIG. 19 outlines the process involved when the terminal 23 become unused.

At this time, the terminal 23 transmits an information indicating the terminal 23 will become unused (a status changing information 703). The status changing information 703 is transmitted from a local storage 73 of the terminal 23 to the terminal 21. As methods of transmitting the status changing information 703, there are such method as accompanying the status changing information 703 to the data transmission and reception, and a method of transmission independent from the data transmission and reception.

When the terminal 21 receives the status changing information 703 of the terminal 23, it deletes the log record information copy 313 recorded in the terminal 21. Due to this deletion, only the log record information 310 to 312 remain to be recorded in the terminal 21. And now the log record information 310 to 312 indicate that all stores the update log 211, therefore, the terminal 21 can delete the update log 211.

On the other hand, when the terminal 23 does not transmit the status changing information 703, that is if the terminal 23 became unused before the terminal 23 receives the update log 211, then a content of the log record information copy 313 in the terminal 21 is not updated as storing the update log 211, therefore, the terminal 21 can never delete the update log 211.

As such, an amount of the update log for storing can be reduced based on an arrangement of the status changing information.

Other than the method of directly transmitting the status changing information to the other terminals as described previously, a method of indirectly transferring the status changing information received by a terminal to the other terminals is possible. As a transferring method in such cases, there are a method which is performed independently of the data transmission and reception, or a method of accompanied by to the data transmission and reception. Also, when transferring the status changing information received by a terminal to the other terminals, there is a method of transferring to the other terminals immediately after receiving the status changing information, and a method of transmitting to the other terminal sometime after receiving the status changing information.

Figure 20:
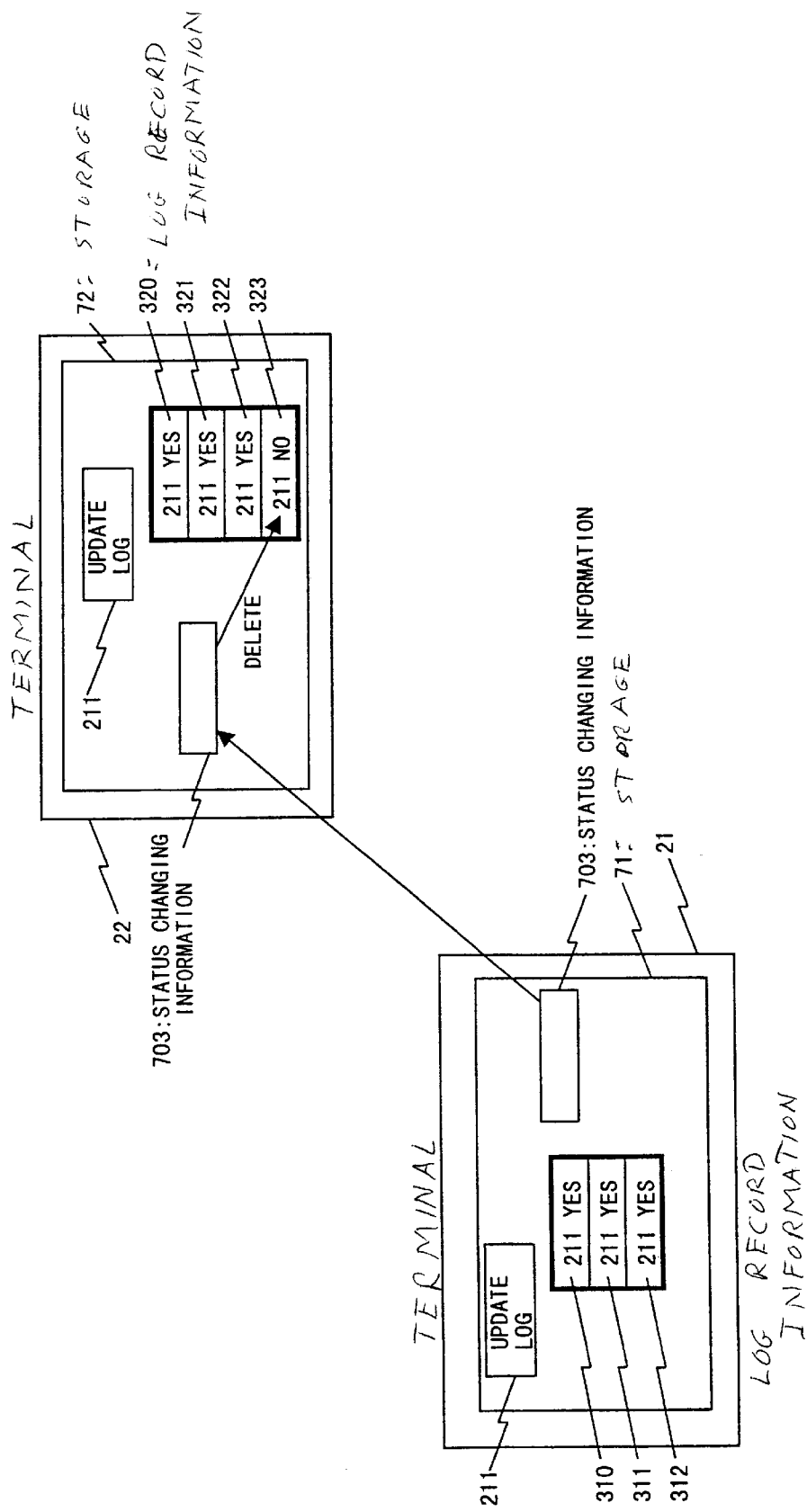
FIG. 20 illustrates transferring of a status changing information from the terminal to the terminal.

As described in the drawing of FIG. 20, when the status changing information 703 is transferred from the terminal 21 to the terminal 22, the log record information 323 is deleted at the terminal 22, and the log record information copies 320 to 322 indicate that they all stores the update log 211, therefore, the update log 211 can be deleted also at the terminal 22, and an amount of data stored in the terminal 22 is reduced.

Embodiment 6

In the present embodiment, a method of combining the methods of embodiments 1, 3, 4 and 5 is described.

Figure 21:
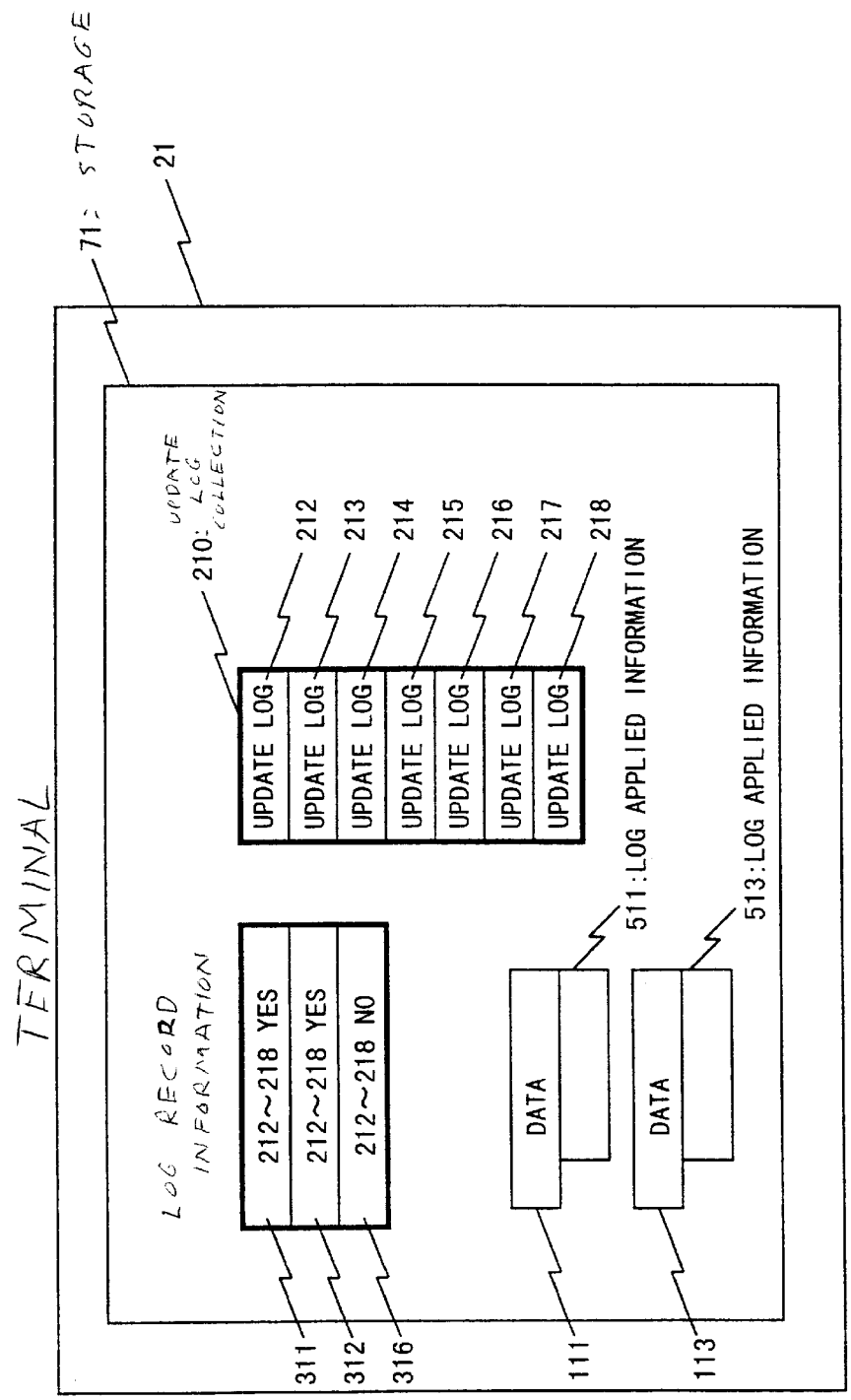
FIG. 21 illustrates a combined method of the method of embodiment 1 and the method of embodiments 3, 4 and 5.

As illustrated in the drawing of FIG. 21, the log record information 312 of the terminal 22 and the log record information copy 316 of the unused terminal 40 are present in the terminal 21. The update logs 212 to 215 related to the data copy 111 in the terminal 21 are decided as not required to be transmitted to the unused terminal 40 since the update logs 212 to 215 related to the data copy 111 meets the situation (A) (see FIG. 10). Likewise, for another data 113 in the terminal 21, the update logs 216 to 218 related to the data 113 are decided as not required to be transmitted to the unused terminal 40 since the update logs 216 to 218 meets the situation (A).

Assuming only the update logs 212 to 218 are present in the update log collection 210 of the terminal 21, this means that all the update logs in the terminal 21 are decided not to be transmitted to the unused terminal 40. At this time, the log record information copy 316 does not function at all as a condition to store the update logs. The terminal 21, taking into account this fact, deletes the log record information copy 316 like the deletion of the log record information of the embodiment 2.

Figure 22:
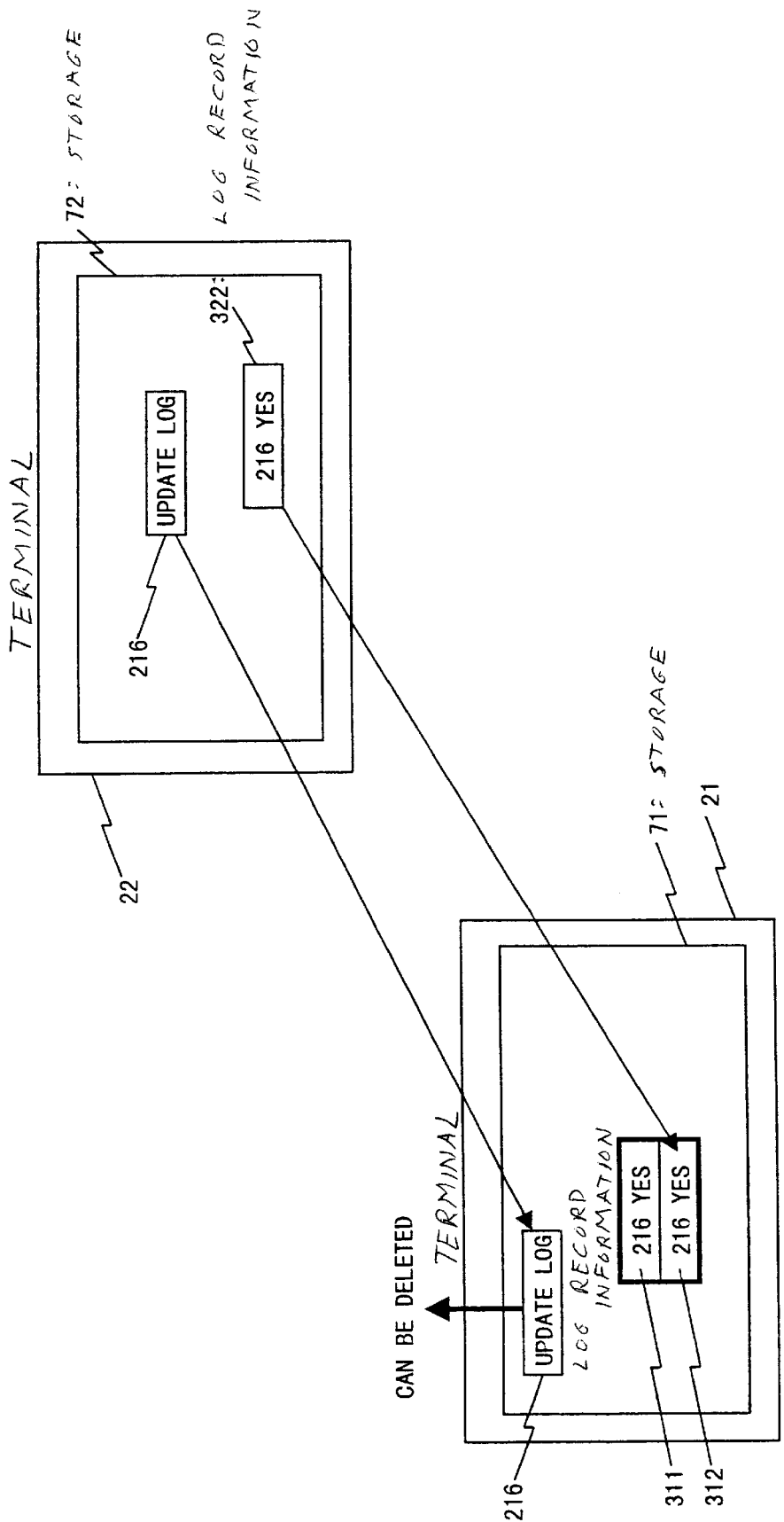
FIG. 22 illustrates a state after a log record information copy 316 is deleted.

FIG. 22 illustrates the state after the log record information copy 316 has been deleted from the terminal 21. When a new update log 216 arrives to the terminal 21 from the terminal 22, since the log record information copy 312 can show that the update log 216 exists at the terminal 22, therefore, the terminal 21 deletes the update log 216.

Figure 23:
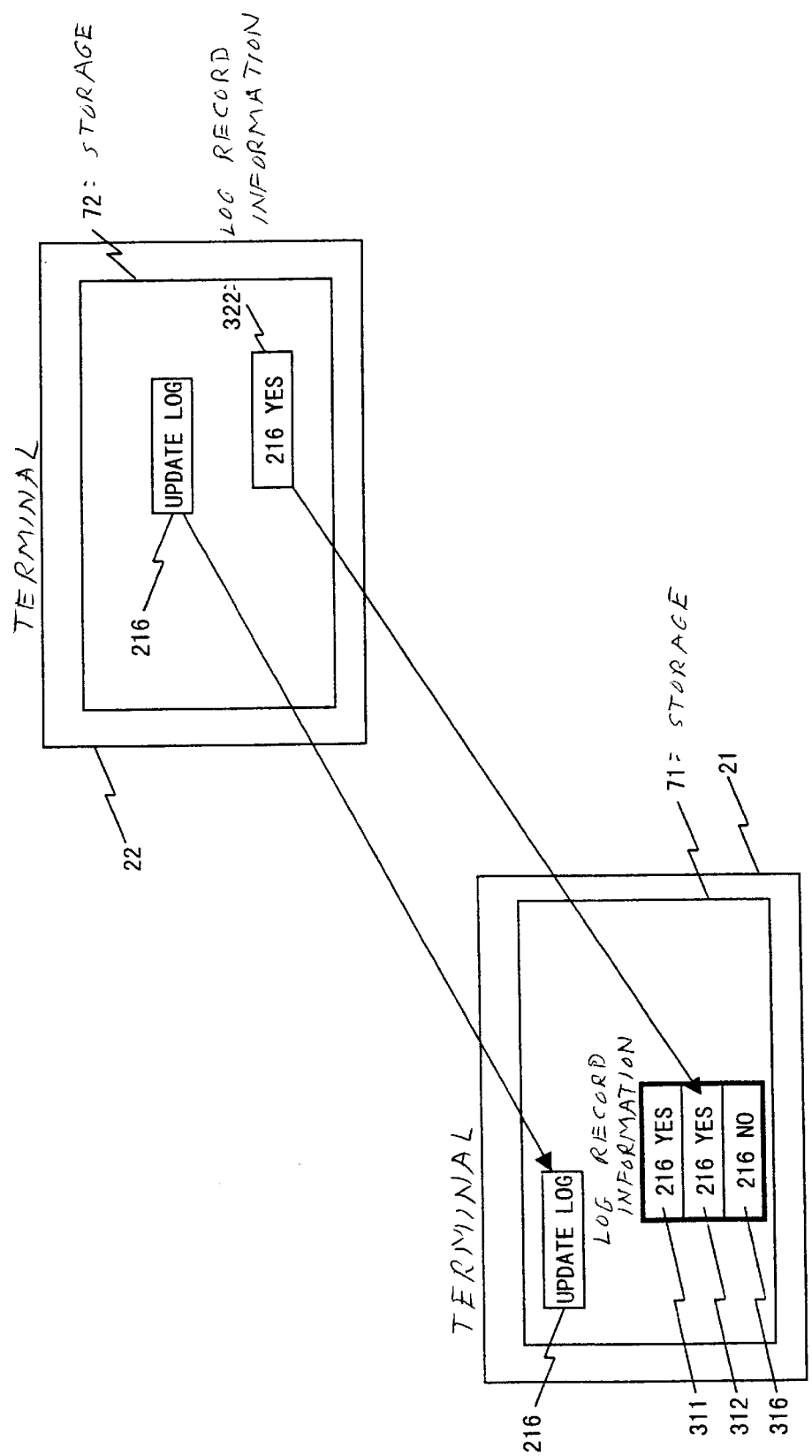
FIG. 23 illustrates a case when the log record information copy 316 is not deleted.

On the other hand, in the log record information copy 316 is not deleted as illustrated in FIG. 23, since the log record information copy 316 indicates that the update log 216 is not stored at the terminal 40, therefore, the terminal 21 cannot delete the update log 216.

As described in the embodiment 2, when the environment where the data transmission and reception of the terminals occurs frequently and the environment where the data transmission and reception of the terminals occurs rarely are clearly distinguished as in FIG. 12, the log record information copy that can be deleted by using the methods of the present embodiments belongs to either one of the following terminals: a terminal where the data transmission and reception occurs frequently has become unused; or a terminal where an occurrence of the data transmission and reception is rare. The former case meets an initial aim of the present invention which is to eliminate the log record information of the unused terminal. For the latter case, by deleting the log record information copy, the data itself will be transmitted instead of the update log, and there is a possibility of amount of data transferring may increase more than the case of transmitting the update log, but the occurrence of this is rare, and an increase in the amount of data transmission and reception in a whole system is kept small.

The update log management device terminal and the update log management method as described in the embodiments 1 to 6, for a data sharing system for maintaining an identical data stored by a plurality of devices under a network environment includes the followings: recording updates made in the data as the update logs; extracting update logs from the update log collection recorded in the device; transmitting and receiving the extracted update logs in order to maintain the identical data among the plurality of devices; verifying whether the transmitted update logs are received by all of the plurality of devices; and deleting from the record the update log that has been verified as received by all the devices.

The characteristic of the present invention is summarized below.

(1) A device terminal for storing a data or a plurality of data comprises: a step of extracting the update logs that need be transmitted to the other terminals from the update log collections; and a step of selecting (a) if a total physical data amount of all the update logs to be transmitted exceeds an amount of transmitting data itself, or a step of selecting (b) if the total physical data amount of all the update logs to be transmitted does not exceed the amount of transmitting data itself.

(a) transmitting the data itself and not the update logs and also transmitting the information indicating which update logs are applied by the data itself.

(b) transmitting the extracted update log.

(2) Regarding an update log extracted from the update log collection of a data, wherein if the extracted update log is transmitted to all of the devices, then the extracted update log is no longer stored in the device (i.e. the extracted update log is deleted from the record).

(3) In a step of verifying whether an update log is received by all the devices, a decision (2) is performed based on the following information: the indirect log record information for indicating which update log is stored at each device that performed the indirect communication; and the log record information for indicating which update log is stored by a device that performed the direct communication.

(4) A device will selectively hold the indirect log record information of the other devices. A device will selectively deletes the indirect log record information from the record.

(5) Time limit is set beforehand. If no update was made during the time limit from the last update, the indirect log record information is deleted from the record.

(6) A device sets an identifier which specifies the plurality of devices collectively as one domain. A device can belong to a plurality of domains. The indirect log record information of those devices not specified by the identifier are not stored (even if received them, will not be recorded);

(7) When a first device performs the data exchange, the device transmits a signal (status changing information) requesting for deleting the log record information instead of transmitting the log record information, and a second device that received this signal deletes the indirect log record information or the log record information of the first device.

(8) For all the data stored in a first device, when (1) (b) establishes for the data of a second device stored in the first device, then the log record information or the indirect log record information of the second device are deleted.

According to the present invention, the update logs can be deleted as early as possible. Also, according to the present invention, amount of recording the update logs can be kept small.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An update log management device used in a data sharing system for maintaining and storing a data replicated among a plurality of devices connected in a network, comprising:

a storage for recording a plurality of update logs wherein each one of the plurality of update logs shows an update of the data;

an extracting unit for extracting at least one of update logs from the plurality of update logs stored in the storage to transmit to another device to maintain the identical data among the plurality of devices;

a comparing unit for calculating data amount X which is an addition of data amount of the at least one of update logs for transmitting to the another device extracted by the extracting unit, and for calculating data amount Y which is an addition of data amount of the data itself plus data amount of log applied information indicating that the at least one of update logs is already applied to the data itself, and for comparing the data amount X and the data amount Y;

a transmitting unit for transmitting the data itself and the information indicating that the at least one of update logs is already applied to the data to the another device if the data amount X of the at least one of update logs exceeds the data amount Y (X>Y), and for transmitting the at least one of update logs to the another device if the data amount X of the at least one of update logs does not exceed the data amount Y (X≦Y); and a deleting unit for deleting the at least one of update logs from the storage if X>Y is true for all of the devices.

2. The update log management device according to claim 1, wherein the storage records a log record information which is an information indicating which update logs are stored by each one of the plurality of devices, wherein the extracting unit decides the at least one of update logs to transmit to the another device based on the log record information.

3. The update log management device according to claim 2 further comprising an excluding unit for selectively deleting the log record information of an unused device from the storage.

4. The update log management device according to claim 3, wherein the excluding unit sets a time limit beforehand and deletes the log record information from the storage that is not updated during the time limit.

5. The update log management device according to claim 3, wherein the update log management device sets an identifier which specifies a plurality of devices for sharing the data as one domain, and hold the log record information of the plurality of devices identified by the identifier and does not hold the log record information of the other devices.

6. The update log management device according to claim 3, wherein the excluding unit receives a signal from the unused device for requesting deletion of the log record information of the unused device, and deletes the log record information of the unused device.

7. The update log management device according to claim 3, wherein the excluding unit deletes the log record information of a second device stored at a first device when X>Y is true for all the data stored in the first device.

8. An update log management device used in a data sharing system for maintaining and storing an identical data between a plurality of devices connected in a network, comprising steps of:

recording a plurality of update logs, wherein each one of the plurality of update logs shows an update of the data;

extracting at least one of update logs from the plurality of update logs stored in the storage to transmit to another device to maintain the identical data among the plurality of devices;

calculating data amount X which is an addition of data amount of the at least one of update logs for transmitting to the another device extracted by the extracting unit, and for calculating data amount Y which is an addition of data amount of the data itself plus data amount of log applied information indicating that the at least one of update logs is already applied to the data itself, and for comparing the data amount X and the data amount Y;

transmitting the data itself and the information indicating that the at least one of update logs is already applied to the data to the another device if the data amount X of the at least one of update logs exceeds the data amount Y (X>Y), and for transmitting the at least one of update logs to the another device if the data amount X of the at least one of update logs does not exceed the data amount Y (X≦Y); and deleting the at least one of update logs from the storage if X>Y is true for all of the devices.

9. An update log management device used in a data sharing system for maintaining and storing a data replicated among a plurality of devices connected in a network, comprising:

a storage for recording a plurality of update logs wherein each one of the plurality of update logs shows an update of the data;

an extracting unit for extracting at least one of update logs from the plurality of update logs stored in the storage to transmit to another device to maintain the identical data among the plurality of devices;

a comparing unit for calculating data amount X which is an addition of data amount of the at least one of update logs for transmitting to the another device extracted by the extracting unit, and for calculating data amount Y which is an addition of data amount of the data itself plus data amount of an information indicating that the at least one of update logs is already applied to the data itself, and for comparing the data amount X and the data amount Y;

a transmitting unit for transmitting the data itself and the information indicating that the at least one of update logs is already applied to the data to the another device if the data amount X of the at least one of update logs exceeds the data amount Y (X>Y), and for transmitting the at least one of update logs to the another device if the data amount X of the at least one of update logs does not exceed the data amount Y (X≦Y) ; and a deleting unit for deleting the at least one of update logs from the storage if the deleting unit decides that the at least one of update logs are not required to be transmitted to any of the other devices, or if X>Y is true for all of the other devices that have not yet received the extracted at least one of update logs.

10. An update log management device used in a data sharing system for maintaining and storing an identical data between a plurality of devices connected in a network, comprising steps of:

recording a plurality of update logs, wherein each one of the plurality of update logs shows an update of the data;

extracting at least one of update logs from the plurality of update logs stored in the storage to transmit to another device to maintain the identical data among the plurality of devices;

calculating data amount X which is an addition of data amount of the at least one of update logs for transmitting to the another device extracted by the extracting unit, and for calculating data amount Y which is an addition of data amount of the data itself plus data amount of an information indicating that the at least one of update logs is already applied to the data itself, and for comparing the data amount X and the data amount Y;

transmitting the data itself and the information indicating that the at least one of update logs is already applied to the data to the another device if the data amount X of the at least one of update logs exceeds the data amount Y (X>Y), and for transmitting the at least one of update logs to the another device if the data amount X of the at least one of update logs does not exceed the data amount Y (X≦Y) ; and deleting the at least one of update logs from the storage if the deleting unit decides that the at least one of update logs are not required to be transmitted to any of the other devices, or if X>Y is true for all of the other devices that have not yet received the extracted at least one of update logs.

* * * * *